(12) United States Patent
Montie et al.

(10) Patent No.: US 11,499,550 B2
(45) Date of Patent: Nov. 15, 2022

(54) SEALING IN HELICAL TROCHOIDAL ROTARY MACHINES

(71) Applicant: ROTOLIPTIC TECHNOLOGIES INCORPORATED, Squamish (CA)

(72) Inventors: Greg John Montie, Squamish (CA); Bryan Allen Callaway, Seattle, WA (US)

(73) Assignee: Rotoliptic Technologies Incorporated, Squamish (CA)

( * ) Notice: Subject to any disclaimer, the term of this patent is extended or adjusted under 35 U.S.C. 154(b) by 48 days.

(21) Appl. No.: 17/067,755

(22) Filed: Oct. 11, 2020

(65) Prior Publication Data

US 2021/0025392 A1    Jan. 28, 2021

Related U.S. Application Data

(63) Continuation of application No. 16/805,698, filed on Feb. 29, 2020, now Pat. No. 10,844,859, which is a (Continued)

(51) Int. Cl.
*F04C 27/00* (2006.01)
*F01C 1/10* (2006.01)
(Continued)

(52) U.S. Cl.
CPC .............. *F04C 2/1073* (2013.01); *F01C 1/04* (2013.01); *F01C 1/104* (2013.01); *F01C 1/22* (2013.01);
(Continued)

(58) Field of Classification Search
CPC .......... F04C 27/008; F04C 2/22; F01C 1/101; F01C 1/104
See application file for complete search history.

(56) References Cited

U.S. PATENT DOCUMENTS 724,994 A    4/1903  Cooley
1,340,625 A   5/1920  Planche
(Continued)

FOREIGN PATENT DOCUMENTS

DE    2014499 A1    10/1971
EP    1552124 A1    5/2006
(Continued)

OTHER PUBLICATIONS

U.S. Appl. No. 17/198,231, filed Mar. 10, 2021, Office Action dated Aug. 31, 2021.
(Continued)

*Primary Examiner* — Deming Wan
(74) *Attorney, Agent, or Firm* — Cook Alex Ltd.

(57) ABSTRACT

Sealing in rotary positive displacement machines based on trochoidal geometry that comprise a helical rotor that undergoes planetary motion within a helical stator is described. Seals can be mounted on the rotor, the stator, or both. The rotor can have a hypotrochoidal cross-section, with the corresponding stator cavity profile being the outer envelope of the rotor as it undergoes planetary motion, or the stator cavity can have an epitrochoidal cross-section with the corresponding rotor profile being the inner envelope of the trochoid as it undergoes planetary motion. In some embodiments, the geometry is offset in a manner that provides advantages with respect to sealing in the rotary machine. In multi-stage embodiments, the rotor-stator geometry remains substantially constant or varies along the axis of the rotary machine.

20 Claims, 25 Drawing Sheets

Related U.S. Application Data continuation of application No. PCT/CA2019/051274, filed on Sep. 10, 2019.

(60) Provisional application No. 62/783,088, filed on Dec. 20, 2018, provisional application No. 62/730,025, filed on Sep. 12, 2018, provisional application No. 62/729,763, filed on Sep. 11, 2018.

(51) Int. Cl.

| | | |
|---|---|---|
| F04C 2/22 | (2006.01) | |
| F04C 2/107 | (2006.01) | |
| F01C 1/22 | (2006.01) | |
| F04C 18/48 | (2006.01) | |
| F04C 3/00 | (2006.01) | |
| F01C 1/04 | (2006.01) | |
| F02B 53/00 | (2006.01) | |
| H02K 21/28 | (2006.01) | |
| F01C 21/10 | (2006.01) | |

(52) U.S. Cl.
CPC .......... F04C 2/22 (2013.01); F04C 3/00 (2013.01); F04C 18/48 (2013.01); F01C 21/106 (2013.01); F02B 2053/005 (2013.01); F02B 2730/018 (2013.01); F04C 27/008 (2013.01); F04C 2240/10 (2013.01); F04C 2240/20 (2013.01); F04C 2250/20 (2013.01); F04C 2250/30 (2013.01); H02K 21/28 (2013.01)

(56) References Cited

U.S. PATENT DOCUMENTS

| | | |
|---|---|---|
| 1,575,987 A | 3/1926 | Gilman |
| 1,636,486 A | 7/1927 | Planche |
| 1,686,569 A | 10/1928 | McMillan |
| 1,738,645 A | 12/1929 | Gilman |
| 1,892,217 A | 12/1932 | Moineau |
| 2,612,022 A | 9/1952 | Keys |
| 2,919,062 A | 12/1959 | Tryhorn |
| 2,988,008 A | 6/1961 | Wankel |
| 3,259,113 A | 7/1966 | Hamada |
| 3,279,388 A | 10/1966 | Roudaut |
| 3,296,874 A | 1/1967 | Wyczalek |
| 3,299,822 A | 1/1967 | Payne |
| 3,302,870 A | 2/1967 | Schell |
| 3,387,772 A | 6/1968 | Wutz |
| 3,398,643 A | 8/1968 | Schudt |
| 3,458,120 A | 7/1969 | Pfaff et al. |
| 3,465,729 A | 9/1969 | Jones |
| 3,512,904 A | 5/1970 | Allen |
| 3,533,716 A | 10/1970 | Grun |
| 3,728,049 A | 4/1973 | Miller |
| 3,764,239 A | 10/1973 | Huf |
| 3,917,437 A | 11/1975 | Link |
| 3,918,137 A | 11/1975 | Telang et al. |
| 3,958,906 A | 5/1976 | Catterson et al. |
| 3,990,817 A | 11/1976 | Ruf et al. |
| 4,012,180 A | 3/1977 | Berkowitz et al. |
| 4,018,548 A | 4/1977 | Berkowitz |
| 4,028,021 A | 6/1977 | Berkowitz |
| 4,061,445 A | 12/1977 | Doshi |
| 4,118,157 A | 10/1978 | Mayer |
| 4,144,001 A | 3/1979 | Streicher |
| 4,218,199 A | 8/1980 | Eiermann |
| 4,296,500 A | 10/1981 | Monties et al. |
| 4,299,097 A | 11/1981 | Shank et al. |
| 4,330,240 A | 5/1982 | Eslinger |
| 4,382,755 A | 5/1983 | Hoffmann |
| 4,395,206 A | 7/1983 | Hoffmann |
| 4,397,619 A | 8/1983 | Alliquander et al. |
| 4,407,639 A | 10/1983 | Maruyama |
| 4,410,305 A | 10/1983 | Shank et al. |
| 4,487,561 A | 12/1984 | Eiermann |
| 4,507,067 A | 3/1985 | Hansen |
| 4,519,206 A | 5/1985 | Van Michaels |
| 4,551,073 A | 11/1985 | Schwab |
| 4,594,060 A | 6/1986 | Schwab |
| 4,728,270 A | 3/1988 | Hoffmann |
| 4,802,830 A | 2/1989 | Nakajima |
| 4,934,325 A | 6/1990 | Snyder |
| 5,069,606 A | 12/1991 | Bachellerie |
| 5,096,004 A | 3/1992 | Ide |
| 5,127,377 A | 7/1992 | Yang |
| 5,169,298 A | 12/1992 | Hekman et al. |
| 5,171,138 A | 12/1992 | Forrest |
| 5,295,814 A | 3/1994 | Uebel |
| 5,302,096 A | 4/1994 | Cavalleri |
| 5,372,107 A | 12/1994 | Smythe |
| 5,379,736 A | 1/1995 | Anderson |
| 5,439,359 A | 8/1995 | Leroy et al. |
| 5,609,475 A | 3/1997 | Eiermann |
| 6,074,184 A | 6/2000 | Imai |
| 6,093,004 A | 7/2000 | Varadan et al. |
| 6,213,744 B1 | 4/2001 | Choroszylow et al. |
| 6,236,897 B1 | 5/2001 | Lee et al. |
| 6,530,357 B1 | 3/2003 | Yaroshenko |
| 6,718,938 B2 | 4/2004 | Szorenyi |
| 6,776,136 B1 | 8/2004 | Kazempour |
| 6,923,628 B1 | 8/2005 | Otto |
| 6,926,505 B2 | 8/2005 | Sbarounis |
| 6,974,313 B2 | 12/2005 | Beaudoin |
| 7,101,160 B2 | 9/2006 | Gennami et al. |
| 7,117,839 B2 | 10/2006 | Horstin |
| 7,395,805 B1 | 7/2008 | MacMurray |
| 7,540,728 B2 | 6/2009 | Gorban |
| 7,549,850 B2 | 6/2009 | Trapalis |
| 7,553,138 B2 | 6/2009 | Gorban |
| 7,726,115 B2 | 6/2010 | Murrow et al. |
| 7,837,451 B2 | 11/2010 | Wiedenhoefer et al. |
| 7,942,657 B2 | 5/2011 | Gray |
| 8,356,585 B2 | 1/2013 | Hathaway et al. |
| 8,523,545 B2 | 9/2013 | Wilbourne et al. |
| 8,523,546 B2 | 9/2013 | Shkolnik et al. |
| 8,539,930 B2 | 9/2013 | Gray |
| 8,539,931 B1 | 9/2013 | Hanna |
| 8,888,474 B2 | 11/2014 | Hohl et al. |
| 8,905,733 B2 | 12/2014 | Guidry |
| 9,051,780 B2 | 6/2015 | Trushin |
| 10,087,758 B2 | 10/2018 | Montie et al. |
| 10,837,444 B2 | 11/2020 | Montie et al. |
| 10,844,720 B2 | 11/2020 | Montie |
| 10,844,859 B2 * | 11/2020 | Montie ............ F01C 21/106 |
| 2002/0122722 A1 | 9/2002 | Bertin et al. |
| 2003/0102629 A1 * | 6/2003 | Bhate ............ F01D 11/003 277/355 |
| 2005/0017053 A1 | 1/2005 | Sbarounis |
| 2006/0073032 A1 | 4/2006 | Parrett |
| 2006/0233653 A1 | 10/2006 | Trapalis |
| 2008/0031758 A1 | 2/2008 | Rosam et al. |
| 2008/0193309 A1 | 8/2008 | Kothnur et al. |
| 2009/0220369 A1 | 9/2009 | Wiedenhoefer et al. |
| 2009/0241536 A1 | 10/2009 | Gale et al. |
| 2010/0183454 A1 | 7/2010 | Lübke et al. |
| 2011/0262291 A1 | 10/2011 | Fleger et al. |
| 2012/0070326 A1 | 3/2012 | Hammerbeck |
| 2012/0156078 A1 | 6/2012 | Guidry |
| 2012/0177484 A1 | 7/2012 | Lusted et al. |
| 2012/0240885 A1 | 9/2012 | Horn |
| 2013/0028775 A1 | 1/2013 | Gekht et al. |
| 2013/0064702 A1 | 3/2013 | Hohl et al. |
| 2015/0030492 A1 * | 1/2015 | Montie ............ F01C 21/106 418/260 |
| 2016/0141921 A1 | 5/2016 | Kubes |
| 2017/0074100 A1 | 3/2017 | Jarvis et al. |
| 2017/0137005 A1 | 5/2017 | Weh et al. |
| 2017/0321697 A1 | 11/2017 | Beinert et al. |

(56) References Cited

U.S. PATENT DOCUMENTS

2018/0291900 A1 10/2018 Falkenberg et al.
2020/0200174 A1 6/2020 Montie et al.

FOREIGN PATENT DOCUMENTS

| EP | 1988288 B1 | 11/2008 |
| JP | 1010141265 A1 | 5/1998 |
| JP | H1010141265 A1 | 5/1998 |
| JP | H275663124 B1 | 2/2015 |
| WO | 1999056004 A1 | 11/1999 |
| WO | WO 1999056004 A1 | 11/1999 |
| WO | 2005078239 A1 | 8/2005 |
| WO | WO 2005078239 A1 | 8/2005 |
| WO | 2009103528 A2 | 10/2009 |
| WO | WO 2009103528 A2 | 10/2009 |
| WO | 2010131103 A2 | 3/2011 |
| WO | WO 2010131103 A2 | 3/2011 |

OTHER PUBLICATIONS

Ansdale, R., The Wankel RC Engine, (1968), p. 20.
Wydra, L., The Development of Outer-Envelope Trochoidal Compressors, International Compressor Engineering Conference (1986), pp. 282-292.
Wrede et al., Recent Status of Trochoidal Type Compressors for Heat Pumps in Germany, International Compressor Engineering Conference (1986), pp. 254-282.
International Search Report and Written Opinion dated Nov. 13, 2019 issued in connection with International Application No. PCT/CA2019/051273.
International Search Report and Written Opinion dated Nov. 18, 2019 issued in connection with International Application No. PCT/CA2019/051274.
International Search Report and Written Opinion dated Nov. 19, 2019 issued in connection with International Application No. PCT/CA2019/051272.
U.S. Appl. No. 14/296,433, filed Jun. 4, 2014, Office Action dated Dec. 23, 2016, Office Action dated Jun. 22, 2017.
U.S. Appl. No. 15/924,173, filed Mar. 16, 2018, Office Action dated Apr. 14, 2020.
U.S. Appl. No. 16/805,698, filed Feb. 29, 2020, Office Action dated Apr. 22, 2020, Notice of Allowance dated Sep. 10, 2020.
U.S. Appl. No. 16/805,712, filed Feb. 29, 2020, Office Action dated Apr. 20, 2020, Notice of Allowance dated Sep. 24, 2020.
PCT/CA2019/051272, International Search Report and Written Opinion dated Nov. 19, 2019.
PCT/CA2019/051273, International Search Report and Written Opinion dated Nov. 13, 2019.
PCT/CA2019/051274, International Search Report and Written Opinion dated Nov. 18, 2019.
International Preliminary Report on Patentability dated Mar. 9, 2021, issued in connection with International Application No. PCT/CA2019/051272.
International Preliminary Report on Patentability dated Mar. 9, 2021, issued in connection with International Application No. PCT/CA2019/051273.
International Preliminary Report on Patentability dated Mar. 9, 2021, issued in connection with International Application No. PCT/CA2019/051274.
UK Examination Report dated Mar. 1, 2022, issued in connection with Great Britain Application No. GB 2104634.7.
International Search Report and Written Opinion dated Mar. 29, 2022, issued in connection with International Application No. PCT/CA2022/050021.
Extended European Search Report dated May 16, 2022, in connection with PCT Patent Application PCT/CA2019/051274.
EP 19859949.0 filed on Apr. 7, 2021, Extended European Search report dated May 16, 2022.
U.S. Appl. No. 17/067,772, filed Oct. 12, 2020, Office Action dated Mar. 21, 2022.
U.S. Appl. No. 17/198,124, filed Mar. 10, 2021, Office Action dated Mar. 31, 2022.
PCT/CA2019/051272, International Preliminary Report on Patentability dated Mar. 9, 2021.
PCT/CA2019/051273, International Preliminary Report on Patentability dated Mar. 9, 2021.
PCT/CA2019/051274, International Preliminary Report on Patentability dated Mar. 9, 2021.
PCT/CA2022/050021, International Search Report and Written Opinion dated Mar. 29, 2022.
GB 2104634.7 filed on Mar. 31, 2021, Examination Report dated Mar. 1, 2022.
Extended European Search Report dated Jul. 8, 2022, in connection with European Patent Application 19860104.9.

* cited by examiner

SECTION D-D

END VIEW    SECTIONS E-E

SECTION A-A

SECTION B-B

SECTION A-A

SECTION B-B

SEALING IN HELICAL TROCHOIDAL ROTARY MACHINES

CROSS-REFERENCE TO RELATED APPLICATIONS

This application is a continuation of and claims priority benefits from U.S. application Ser. No. 16/805,698 filed on Feb. 29, 2020, entitled "Sealing In Helical Trochoidal Rotary Machines". The '698 application is a continuation of and claims priority benefits from International Application No. PCT/CA2019/051274 filed on Sep. 10, 2019, entitled "Sealing In Helical Trochoidal Rotary Machines". The '274 application is related to and claims priority benefits from U.S. Provisional Patent Application Ser. No. 62/729,763 filed Sep. 11, 2018 entitled "Helical Trochoidal Rotary Machines", U.S. Provisional Patent Application Ser. No. 62/730,025 filed Sep. 12, 2018 entitled "Helical Trochoidal Rotary Machines With Offset", and U.S. Provisional Patent Application Ser. No. 62/783,088 filed Dec. 20, 2018 entitled "Sealing In Helical Trochoidal Rotary Machines". The '698, '274, '763, '025 and '088 applications are each hereby incorporated by reference herein in their entireties.

FIELD OF THE INVENTION

The present invention relates to sealing in rotary positive displacement machines, particularly rotary machines based on trochoidal geometry, the machines comprising a helical rotor that undergoes planetary motion within a helical stator.

BACKGROUND OF THE INVENTION

Rotary machines, in which at least one rotor has planetary motion within a stator or housing, can be employed, for example, as positive displacement pumps, rotary compressors, vacuum pumps, expansion engines, and the like.

Pumps are devices that can move a working fluid from one place to another. There is a wide range of end uses for various types of pumps, including irrigation, fire-fighting, flood control, water supply, gasoline supply, refrigeration, chemical movement and sewage transfer. Rotary pumps are typically positive displacement pumps comprising a fixed housing, gears, cams, rotors, vanes and similar elements. Rotary pumps usually have close running clearances (only a small distance or gap between their moving and stationary parts), do not require suction or discharge valves, and are often lubricated only by the fluid being pumped.

A positive displacement pump moves fluid by trapping a volume of fluid in a chamber and forcing the trapped volume into a discharge pipe. Some positive displacement pumps employ an expanding chamber on the suction side and a decreasing chamber on the discharge side. Fluid flows into the pump intake as the chamber on the suction side expands, and the fluid flows out of the discharge pipe as the chamber collapses. The output volume is the same for each cycle of operation. An ideal positive displacement pump can produce the same flow rate at a given pump speed regardless of the discharge pressure.

Various classes of rotary machines based on trochoidal geometries are known. Such rotary machines comprise a rotor or stator whose cross-section is bounded by a certain family of curves, known as trochoids or trochoidal shapes. These include machines with the following configurations:

(1) rotary machines in which the rotor is hypotrochoidal in cross-section, and undergoes planetary motion (spins about its axis and orbits eccentrically) within a stator that is shaped as an outer envelope of that rotor (with the rotor having one more apex or lobe than the stator cavity);

(2) rotary machines in which the stator cavity is hypotrochoidal in cross-section, and the rotor undergoes planetary motion within the stator and is shaped as the inner envelope of that stator (with the rotor having one less apex or lobe than the stator cavity);

(3) rotary machines in which the rotor is epitrochoidal in cross-section, and undergoes planetary motion within a stator that is shaped as an outer envelope of that rotor (with the rotor having one less apex or lobe than the stator cavity); and (4) rotary machines in which the stator cavity is epitrochoidal in cross-section, and the rotor undergoes planetary motion within the stator and is shaped as the inner envelope of that stator (with the rotor having one more apex or lobe than the stator cavity).

Thus, in all of these configurations, the rotor or stator is a trochoidal component, meaning it has a cross-sectional shape that is a trochoid.

Generally, as used herein, an object is said to undergo "planetary motion" when it spins about one axis and orbits about another axis.

Rotary machines, such as those described above, can be designed for various applications including, for example, pumps, compressors, and expansion engines. The design, configuration and operation of different rotary machines can offer particular advantages for certain applications.

Progressive cavity pumps (PCPs) are another type of rotary positive displacement machine that can offer advantages for certain applications. In PCPs, a rotor is disposed and rotates eccentrically within a helical stator cavity. The material to be pumped (typically a fluid) follows a helical path along the pump axis. The rotor is typically formed of rigid material and the stator (or stator lining) of resilient or elastomeric material. The rotor is typically helical with a circular transverse cross-section displaced from the axis of the helix, and defines a single-start thread. The corresponding stator cavity is a double helix (two-start thread) with the same thread direction as the rotor, and in transverse cross-section has an outline defined by a pair of spaced apart semi-circular ends joined by a pair of parallel sides. The pitch (the axial distance between adjacent threads) of the stator is the same as the pitch of the rotor, and the lead of the stator (the axial distance or advance for one complete turn) is twice that of the rotor.

In PCPs, the rotor generally seals tightly against the elastomeric stator as it rotates within it, forming a series of discrete fixed-shape, constant-volume chambers between the rotor and stator. The fluid is moved along the length of the pump within the chambers as the rotor turns relative to the stator. The volumetric flow rate is proportional to the rotation rate. The discrete chambers taper down toward their ends and overlap with their neighbors, so that the flow area is substantially constant and in general, there is little or no flow pulsation caused by the arrival of chambers at the outlet. The shear rates are also typically low in PCPs in comparison to those in other types of pumps. In PCPs, where the rotor touches the stator, the contacting surfaces are generally traveling transversely relative to one another, so small areas of sliding contact occur.

SUMMARY OF THE INVENTION

In a first aspect, a rotary machine comprises a stator and a rotor disposed within the stator. The rotor has a helical profile, and a rotor axis, and has a hypotrochoidal shape at any cross-section transverse to the rotor axis, along at least a portion of a length of the rotor. The stator has a helical profile, a stator axis, and has a shape at any cross-section transverse to the stator axis along at least a portion of a length of the stator that is an outer envelope formed when the hypotrochoidal shape of the rotor undergoes planetary motion. The rotor is configured to undergo planetary motion within the stator. The rotary machine further comprises at least one helical seal mounted on the rotor and/or at least one helical seal mounted on the stator.

In some embodiments of a rotary machine in accordance with a first aspect described above, the hypotrochoidal shape has n lobes, where n is an integer, the outer envelope shape has (n−1) lobes, the pitch of the rotor is the same as the pitch of the stator, and the ratio of the lead of the rotor to the lead of the stator is n:(n−1). In some such embodiments, the hypotrochoidal shape is an ellipse, n=2, the pitch of the rotor is the same as the pitch of the stator, and the ratio of the lead of the rotor to the lead of the stator is 2:1.

In some embodiments of a rotary machine in accordance with a first aspect described above, the rotor has a double-start helical profile having a first rotor thread and a second rotor thread, the stator has a single-start helical profile. In some embodiments, the at least one helical seal comprises two rotor seals mounted on the rotor and/or a stator seal mounted on the stator. In some embodiments, the at least one helical seal comprises a first helical rotor seal mounted in a first groove extending along the crest of the first rotor thread of the helical rotor, and a second helical rotor seal mounted in a second groove extending along the crest of the second thread of the helical rotor. In some embodiments, the at least one helical seal comprises a helical stator seal mounted in a first groove extending along the crest of the first stator thread of the helical stator. In some embodiments, the at least one helical seal comprises a first helical rotor seal mounted in a first groove extending along the crest of the first rotor thread of the helical rotor, a second helical rotor seal mounted in a second groove extending along the crest of the second thread of the helical rotor, and a helical stator seal mounted in a first groove extending along the crest of the first stator thread of the helical stator. In some embodiments, the at least one helical seal comprises a first helical rotor seal mounted on the first rotor thread of the helical rotor by cooperating mating features on the first rotor thread and the first helical rotor seal, and a second helical rotor seal mounted on the second rotor thread of the helical rotor by cooperating mating features on the second rotor thread and the first helical rotor seal.

In a second aspect, a rotary machine comprises a stator and a rotor disposed within the stator. The rotor has a rotor axis and a helical profile, and the rotor has a rotor shape that is inwardly offset from a hypotrochoidal shape at any cross-section transverse to the rotor axis, along at least a portion of a length of the rotor. The stator has a stator axis and a helical profile, and the stator has a stator shape at any cross-section transverse to the stator axis along at least a portion of a length of the stator that is an outer envelope formed when the rotor shape undergoes planetary motion. The rotor is configured to undergo planetary motion within the stator. The rotary machine further comprises at least one helical rotor seal mounted to the rotor and/or at least one helical stator seal mounted to the stator.

In some embodiments of a rotary machine in accordance with a second aspect described above, the hypotrochoidal shape has n lobes, where n is an integer, the outer envelope shape has (n−1) lobes, the pitch of the rotor is the same as the pitch of the stator, and the ratio of the lead of the rotor to the lead of the stator is n:(n−1). In some such embodiments, the hypotrochoidal shape is an ellipse, n=2, the pitch of the rotor is the same as the pitch of the stator, and the ratio of the lead of the rotor to the lead of the stator is 2:1.

In some embodiments of a rotary machine in accordance with a second aspect described above, the rotor has a double-start helical profile having a first rotor thread and a second rotor thread, the stator has a single-start helical profile. In some embodiments, the at least one helical seal comprises two rotor seals mounted on the rotor and/or a stator seal mounted on the stator. In some embodiments, the at least one helical seal comprises a first helical rotor seal mounted in a first groove extending along the crest of the first rotor thread of the helical rotor, and a second helical rotor seal mounted in a second groove extending along the crest of the second thread of the helical rotor. In some embodiments, the at least one helical seal comprises a helical stator seal mounted in a first groove extending along the crest of the first stator thread of the helical stator. In some embodiments, the at least one helical seal comprises a first helical rotor seal mounted in a first groove extending along the crest of the first rotor thread of the helical rotor, a second helical rotor seal mounted in a second groove extending along the crest of the second thread of the helical rotor, and a helical stator seal mounted in a first groove extending along the crest of the first stator thread of the helical stator. In some embodiments, the at least one helical seal comprises a first helical rotor seal mounted on the first rotor thread of the helical rotor by cooperating mating features on the first rotor thread and the first helical rotor seal, and a second helical rotor seal mounted on the second rotor thread of the helical rotor by cooperating mating features on the second rotor thread and the first helical rotor seal.

In some embodiments of a rotary machine in accordance with a second aspect described above, the helical profile of the stator defines at least one inwardly protruding helical thread, and the helical axis of the rotor defines at least one outwardly protruding helical thread. In some embodiments, the rotor shape is inwardly offset from a hypotrochoidal shape to a degree such that the minimum radius of curvature of the at least one outwardly protruding helical thread of the rotor in a plane normal to the at least one outwardly protruding helical thread, is substantially the same as the radius of curvature of the at least one inwardly protruding helical thread of the stator in a plane normal to the inwardly protruding helical thread. In some embodiments, the rotor and stator each have a longitudinal axis, and the rotor shape is inwardly offset from a hypotrochoidal shape to a degree such that the minimum radius of curvature of the at least one outwardly protruding helical thread of the rotor in a plane normal to the longitudinal axis of the rotor is substantially the same as the radius of curvature of the at least one inwardly protruding helical thread of the stator in a plane normal to the longitudinal axis of the stator. In some embodiments, the rotor has a rotor sweep width across the at least one outwardly protruding helical thread in a plane normal to the helical thread; the stator has a stator sweep width across the at least one inwardly protruding helical thread in a plane normal to the helical thread; and the rotor shape is inwardly offset from a hypotrochoidal shape to a degree such that the rotor sweep width is substantially the same as the stator sweep width. In some embodiments, the rotor and stator each have a longitudinal axis; the rotor has a rotor sweep width across the at least one outwardly protruding helical thread in a plane normal to the longitudinal axis of the rotor; the stator has a stator sweep width across the at least one inwardly protruding helical thread in a plane normal to the longitudinal axis of the stator; and the rotor shape is inwardly offset from a hypotrochoidal shape to a degree such that the rotor sweep width is substantially the same as the stator sweep width. In some embodiments, the rotor has a rotor arc length around the at least one outwardly protruding helical thread in a plane normal to the helical thread; the stator has a stator arc length around the at least one inwardly protruding helical thread in a plane normal to the helical thread; and the rotor shape is inwardly offset from a hypotrochoidal shape to a degree such that the rotor arc length is substantially the same as the stator arc length. In some embodiments, the rotor and stator each have a longitudinal axis; the rotor has a rotor arc length around the at least one outwardly protruding helical thread in a plane normal to the longitudinal axis of the rotor; the stator has a stator arc length around the at least one inwardly protruding helical thread in a plane normal to the longitudinal axis of the stator; and the rotor shape is inwardly offset from a hypotrochoidal shape to a degree such that the rotor arc length is substantially the same as the stator arc length.

In a third aspect, a rotary machine comprises a stator and a rotor disposed within the stator. The stator has a helical profile, a stator axis, and has an epitrochoidal shape at any cross-section transverse to the stator axis, along at least a portion of a length of the stator. The rotor has a helical profile, a rotor axis, and has a shape at any cross-section transverse to the rotor axis, along at least a portion of a length of the rotor, that is an inner envelope formed when the epitrochoidal shape of the stator undergoes planetary motion. The rotor is configured to undergo planetary motion within the stator. The rotary machine further comprises at least one helical rotor seal mounted to the rotor and/or at least one helical stator seal mounted to the stator.

In some embodiments of a rotary machine in accordance with a third aspect described above, the epitrochoidal shape of the stator has n−1 lobes, where n is an integer, the inner envelope shape of the rotor has n lobes, the pitch of the rotor is the same as the pitch of the stator, and the ratio of the lead of the rotor to the lead of the stator is n:(n−1). In some such embodiments, n=2, the pitch of the rotor is the same as the pitch of the stator, and the ratio of the lead of the rotor to the lead of the stator is 2:1.

In some embodiments of a rotary machine in accordance with a third aspect described above, the at least one helical seal comprises at least one rotor seal mounted on the rotor.

In some embodiments of a rotary machine in accordance with a third aspect described above, the at least one helical seal comprises at least one stator seal mounted on the stator.

In some embodiments of a rotary machine in accordance with a third aspect described above, the at least one helical seal comprises at least one rotor seal mounted on the rotor and at least one stator seal mounted on the stator.

In some embodiments of a rotary machine in accordance with a third aspect described above, the at least one helical seal comprises a rotor seal mounted on the rotor thread by cooperating mating features on the rotor and the rotor seal, and/or a stator seal mounted on the stator by cooperating mating features on the stator and the stator seal.

In a fourth aspect, a rotary machine comprises a stator and a rotor disposed within the stator. The stator has a stator axis and a helical profile, and the stator has a stator shape that is outwardly offset from an epitrochoidal shape at any cross-section transverse to the stator axis, along at least a portion of a length of the stator. The rotor has a rotor axis and a helical profile, and the rotor has a rotor shape at any cross-section transverse to the rotor axis, along at least a portion of a length of the rotor, that is an inner envelope formed when the stator shape undergoes planetary motion. The rotor is configured to undergo planetary motion within the stator. The rotary machine further comprises at least one helical rotor seal mounted to the rotor and/or at least one helical stator seal mounted to the stator.

In some embodiments of a rotary machine in accordance with a fourth aspect described above, the stator shape has n−1 lobes, where n is an integer, the rotor shape has n lobes, the pitch of the rotor is the same as the pitch of the stator, and the ratio of the lead of the rotor to the lead of the stator is n:(n−1). In some such embodiments, n=2, the pitch of the rotor is the same as the pitch of the stator, and the ratio of the lead of the rotor to the lead of the stator is 2:1.

In some embodiments of a rotary machine in accordance with a fourth aspect described above, the at least one helical seal comprises at least one rotor seal mounted on the rotor.

In some embodiments of a rotary machine in accordance with a fourth aspect described above, the at least one helical seal comprises at least one stator seal mounted on the stator.

In some embodiments of a rotary machine in accordance with a fourth aspect described above, the at least one helical seal comprises at least one rotor seal mounted on the rotor and at least one stator seal mounted on the stator.

In some embodiments of a rotary machine in accordance with a fourth aspect described above, the at least one helical seal comprises a rotor seal mounted on the rotor thread by cooperating mating features on the rotor and the rotor seal, and/or a stator seal mounted on the stator by cooperating mating features on the stator and the stator seal.

In some embodiments of the rotary machines described in the various aspects above, the rotary machine is a multi-stage machine and a plurality of chambers are formed between cooperating surfaces of the rotor and the stator. In some embodiments, each of the plurality of fluid chambers has approximately the same volume. In some embodiments, each of the plurality of chambers has approximately the same dimensions and shape. In some embodiments, at least one of the plurality of chambers has dimensions that are different from another of the plurality of chambers. In some embodiments, at least one of the plurality of chambers has a volume that is different from another of the plurality of chambers.

DETAILED DESCRIPTION OF ILLUSTRATIVE EMBODIMENT(S)

The present application relates to rotary machines in which a helical rotor undergoes planetary motion within a stator. They can provide advantages for various applications, some of which are discussed below.

The rotary machines are based on trochoidal geometries, with the rotor or stator having a trochoidal geometry (in transverse cross-section, i.e. perpendicular to its axis). The rotor can be hypotrochoidal, with the corresponding stator cavity profile being the outer envelope of the rotor as it undergoes planetary motion. Alternatively, the stator cavity can have an epitrochoidal cross-sectional geometry with the corresponding rotor profile being the inner envelope formed by the trochoid as it undergoes planetary motion. In such machines, one or more specific points on the envelope (whether it be the rotor or the stator) is in continuous contact with the corresponding component, and the contact point traces a trochoidal profile as the components execute their relative motion.

Figure 1A:
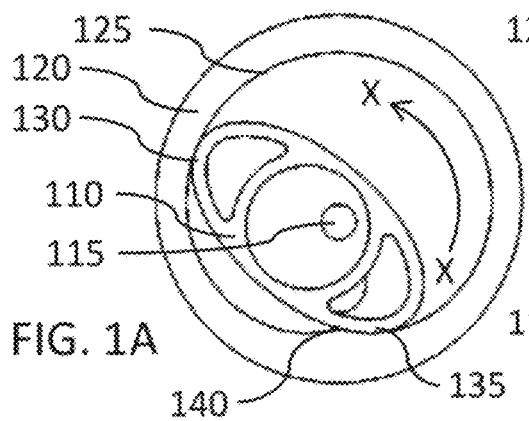
FIGS. 1A-1G (Prior Art) are schematic diagrams illustrating, in transverse cross-section, the geometry of an elliptical rotor and stator assembly at different stages of a single revolution of the elliptical rotor.
Figure 1B:
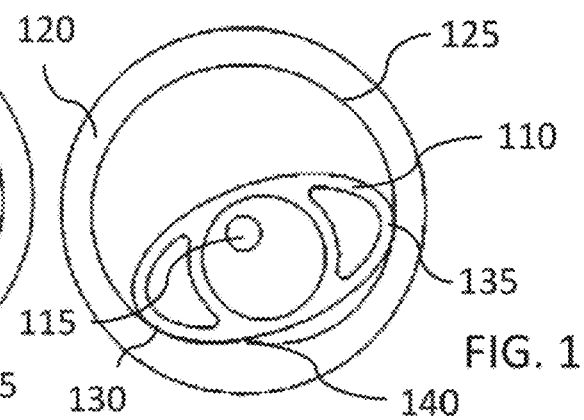
Figure 1C:
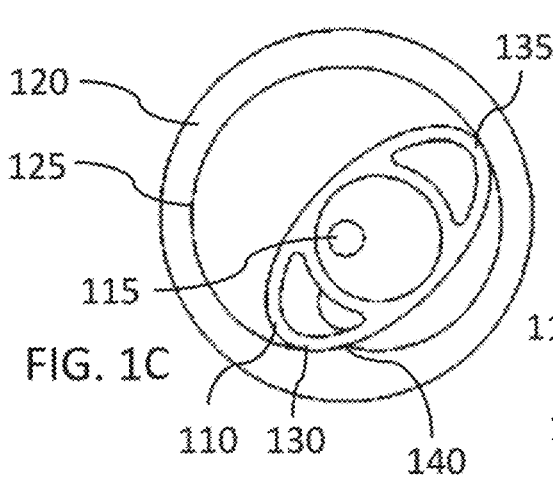
Figure 1D:
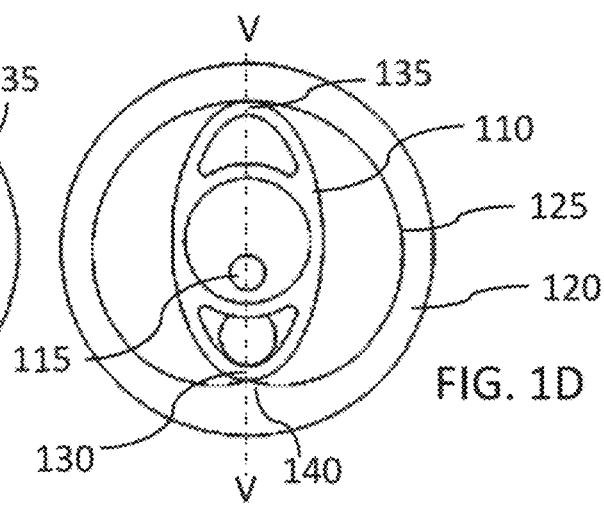
Figure 1E:
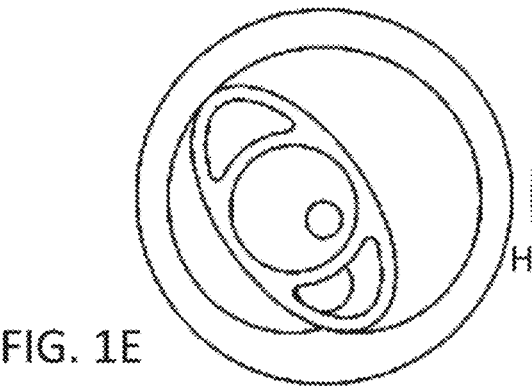
Figure 1F:
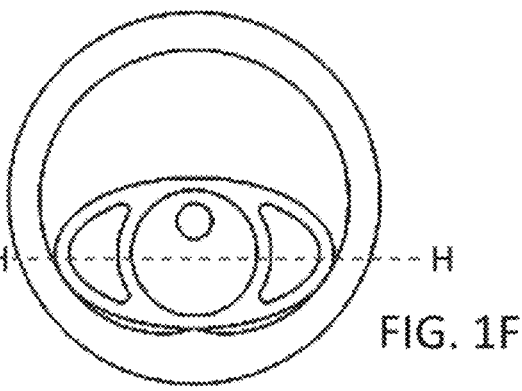
Figure 1G:
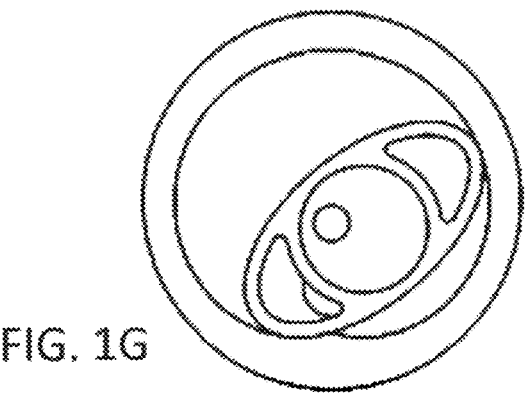

FIGS. 1A-1G are schematic diagrams illustrating the geometry of an example of a known rotary machine where the rotor has a cross-sectional shape that is hypotrochoidal, and the stator cavity is shaped as an outer envelope of the rotor as it undergoes planetary motion. In this example the hypotrochoidal rotor is an elliptical rotor. The rotor 110 and stator 120 are shown at different points in time during a single revolution of the elliptical rotor within the stator. FIG. 1A shows elliptical rotor 110 in a first position within stator 120. Stator inner surface 125 comprises an inverse apex 140. A portion of each of rotor tips 130 and 135 is in contact with inner surface 125 of stator 120, and outer surface of rotor 110 is in contact with inverse apex 140. Rotor 110 spins about its center and rotates eccentrically in the direction indicated by arrow X-X (counter-clockwise) about axis 115. FIG. 1B shows elliptical rotor 110 in a second position after rotor 110 has rotated. A portion of each of rotor tips 130 and 135 remains in contact with stator inner surface 125, and outer surface of rotor 110 remains in contact with inverse apex 140. FIG. 1C shows elliptical rotor 110 in a third position after further rotation. FIG. 1D shows elliptical rotor 110 in a fourth position with its major axis oriented vertically, as indicated by dashed line V-V. A portion of rotor tip 130 is in contact with inverse apex 140 and a portion of rotor tip 135 is in contact with stator inner surface 125 directly above inverse apex 140. For the remainder of the description below for FIGS. 1E-1G, reference numerals have been omitted for clarity. FIGS. 1E-1G show elliptical rotor 110 after further rotations in a counter-clockwise direction. FIG. 1F shows elliptical rotor 110 in a position with its major axis oriented horizontally, as indicated by dashed line H-H. Thus, inner surface 125 of stator 120 in cross-section is designed such that at least a portion of each of rotor tips 130 and 135 is in contact with stator inner surface 125 at all times during a complete revolution of elliptical rotor 110. Inverse apex 140 is in contact with the outer surface of elliptical rotor 110 at all times during a complete revolution of elliptical rotor 110. The contact of elliptical rotor 110 with stator 120 at three positions, as described above, divides the interior volume of stator 120 into three chambers (for example, as shown in FIG. 1F). When elliptical rotor 110 is in contact with stator 120 at only two distinct positions (for example when the major axis of elliptical rotor 110 is oriented vertically, as in FIG. 1D), elliptical rotor 110 divides the interior volume of stator 120 into just two chambers. Ports (not shown in FIGS. 1A-1G) can be provided for inflow and outflow of fluid as desired. The material being conveyed (typically a fluid) moves in an arc or circumferential direction through the rotary machine. Examples of such a machine are described in U.S. Patent Application Publication No. US2015/0030492, which is incorporated by reference herein.

Herein, the terms horizontal, vertical, front, rear and like terms related to orientation are used in reference to the drawings with the particular orientations as illustrated. Nonetheless, the rotary machines and related sub-assemblies described herein can be placed in any orientation suitable for their end-use application.

In embodiments of the present rotary machines, the hypotrochoid and outer envelope (rotor and stator transverse cross-sectional profiles, respectively) are each swept along helical paths, the axes of those helices being the axes of rotation of those components in that reference frame in which both parts undergo simple rotary motion (the "centers" of those components). The axes of the rotor and stator helices are offset from one another by a distance equal to the eccentricity of the rotor. The helical rotor and corresponding stator have the same pitch, and the ratio of the lead of the rotor to the lead of the stator is the same as the ratio of their number of lobes (which is the also the same as the ratio of their number of starts). As used herein, "pitch" is defined as the axial distance between adjacent threads (or crests or roots, for example, on a helix), and "lead" is defined as the axial distance or advance for one complete turn (360°). Pitch and lead are equal with single start helices; for multiple start helices the lead is the pitch multiplied by the number of starts.

Thus, in embodiments of the present rotary machines, when a transverse cross-section is taken in any plane perpendicular to the axis of rotation, the hypotrochoid and envelope (that is, the cross-sectional shape of the rotor and stator, respectively) are seen just as they would be in the usual two-dimensional profile, such as shown in FIGS. 1A-1G, for example. For example, in one embodiment, the outer surface of a helical rotor is defined by an ellipse swept along a helical path, and a corresponding stator cavity is defined by sweeping the corresponding outer envelope along a helical path with half the lead of the helical rotor. The rotor profile is a double-start helix, and the stator profile is a single-start helical cavity. For such a machine, when a transverse cross-section is taken in any plane perpendicular to the axis of rotation, the outer profile of the rotor and inner profile of the stator will be similar to those illustrated for those components in FIGS. 1A-1G.

Figure 2A:
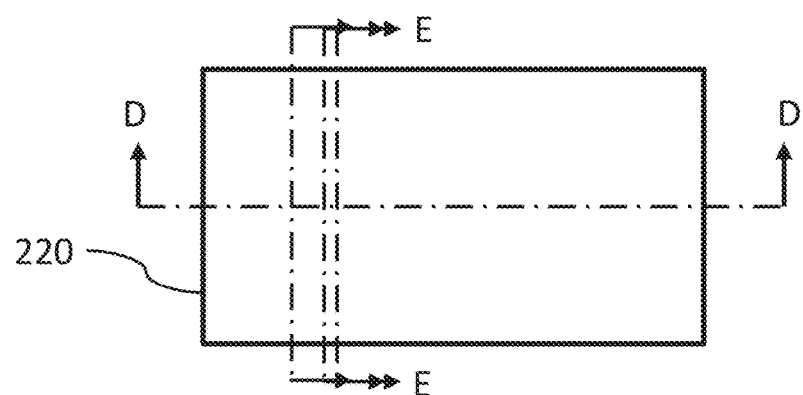
FIG. 2A shows a side view of a rotor-stator assembly showing an outer cylindrical surface of the stator.
Figure 2B:
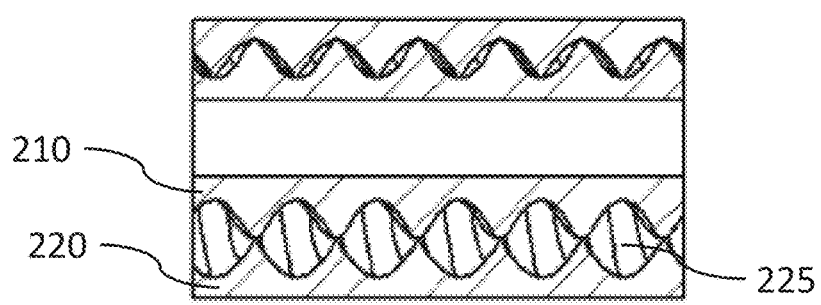
FIG. 2B is a cross-sectional view of the rotor-stator assembly of FIG. 2A, taken in the direction of arrows D-D, showing a helical rotor disposed within a helical stator cavity.
Figure 2C:
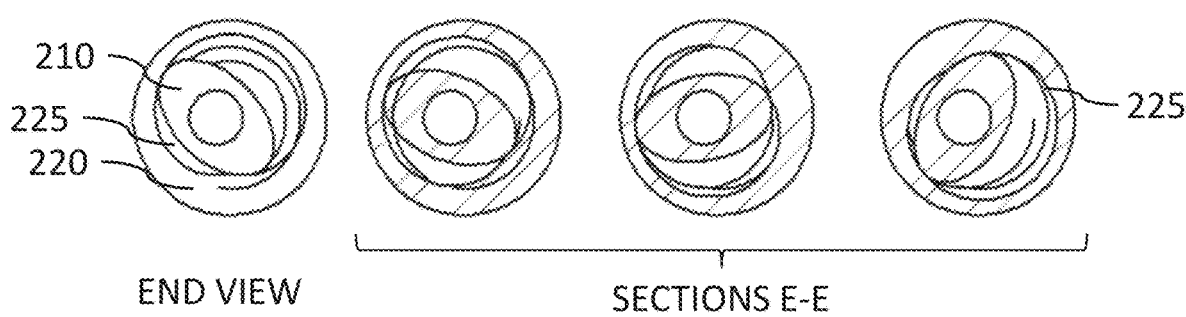
FIG. 2C shows an end view and three cross-sectional views taken in the direction of arrows E-E in FIG. 2A, showing the helical rotor with a two-lobe, elliptical transverse cross-section.

FIGS. 2A-C illustrate an example of such a machine. FIG. 2A shows a side view of a stator 220. The exterior surface of stator 220 is cylindrical. FIG. 2B is a cross-sectional view taken in the direction of arrows D-D in FIG. 2A, and shows a helical rotor 210 disposed within a helical stator cavity 225 defined by stator 220. FIG. 2C shows an end view and various cross-sectional views taken in the direction of arrows E-E in FIG. 2A. Rotor 210 has an elliptical transverse cross-section, as shown in FIG. 2C. As the cross-section E-E progresses along the axis of rotation of rotor 210, the cross-sectional profile of the rotor and stator progresses in a manner analogous to the motion over time of rotor 110 within stator 120, as illustrated in FIGS. 1A-1G. In the embodiment illustrated in FIGS. 2A-2C, rotor 210 has two lobes and stator cavity 225 has one lobe.

Figure 3A:
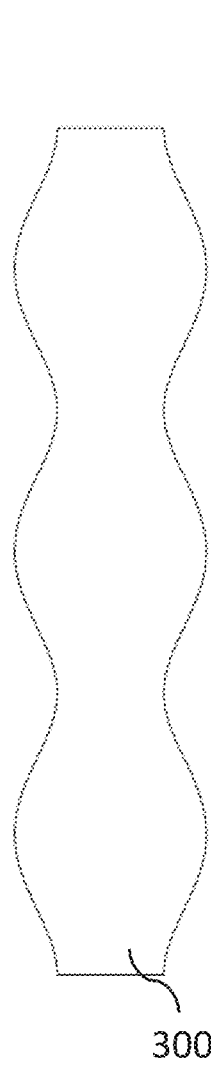
FIG. 3A is a side view of a helical rotor with an elliptical transverse cross-section.
Figure 3B:
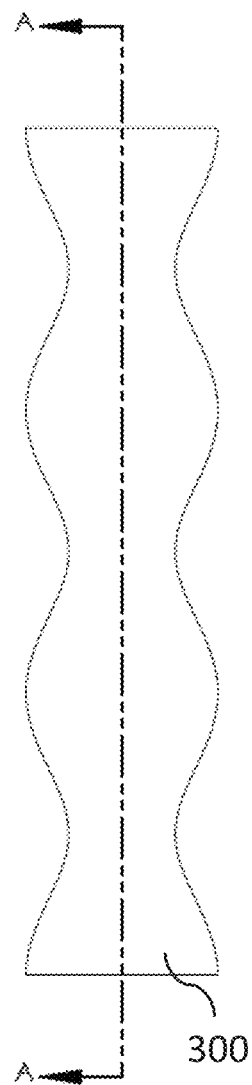
FIG. 3B is another side view of the helical rotor of FIG. 3A, orthogonal to the view of FIG. 3A.
Figure 3C:
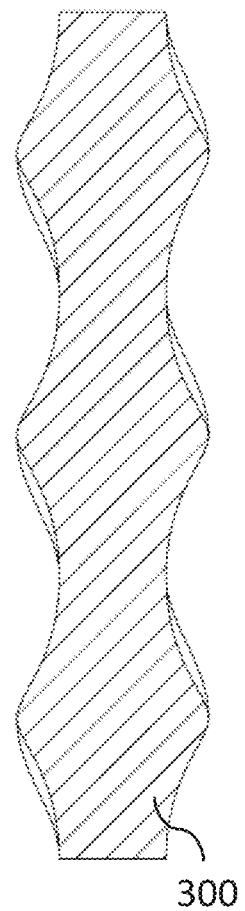
FIG. 3C is a cross-sectional view of the helical rotor of FIG. 3A taken in the direction of arrows A-A in FIG. 3B.

FIG. 3A is a side view of a helical rotor 300 (with an elliptical transverse cross-section) similar to rotor 210 of FIGS. 2A-C. FIG. 3B is another side view of helical rotor 300, orthogonal to the view of FIG. 3A. FIG. 3C shows a cross-sectional view of rotor 300 taken in the direction of arrows A-A in FIG. 3B.

Figure 4A:
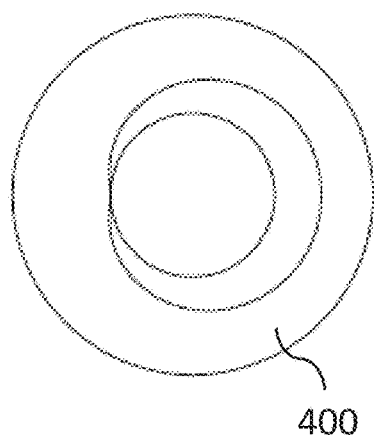
FIG. 4A is an end view of a stator with a helical cavity.
Figure 4B:
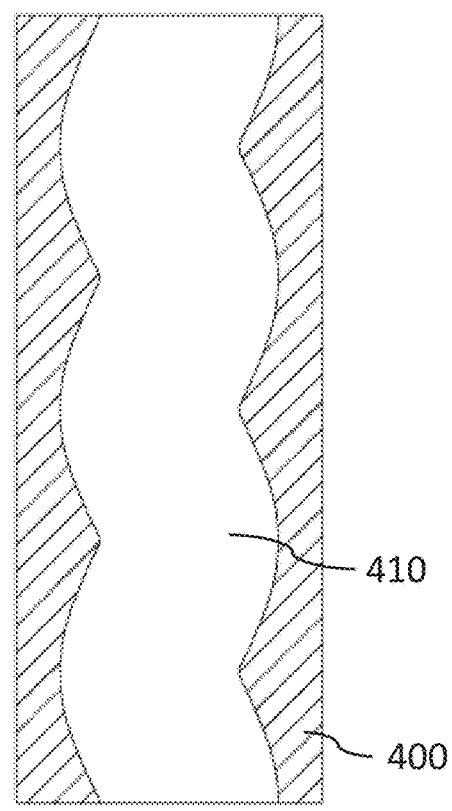
FIG. 4B is a transverse cross-sectional view of the stator of FIG. 4A.
Figure 4C:
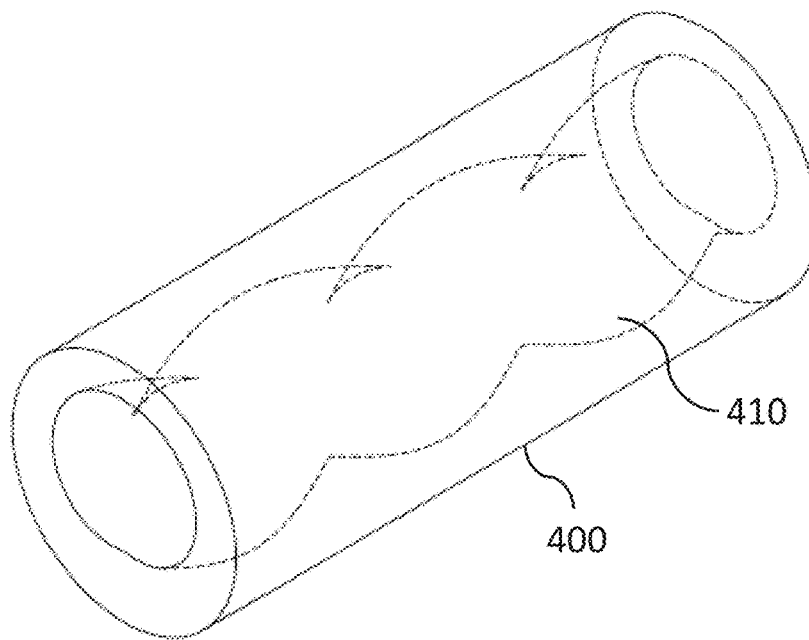
FIG. 4C is an isometric view of the stator of FIG. 4A (with the dashed line indicating the stator cavity).

FIG. 4A is an end view, FIG. 4B is a cross-sectional view and FIG. 4C is an isometric view of a stator 400 (with the dashed line indicating the stator cavity). Stator 400 corresponds to rotor 300 of FIGS. 3A-C (in other words stator 400 can be used with rotor 300), and is similar to stator 220 of FIGS. 2A-C.

Figure 5:
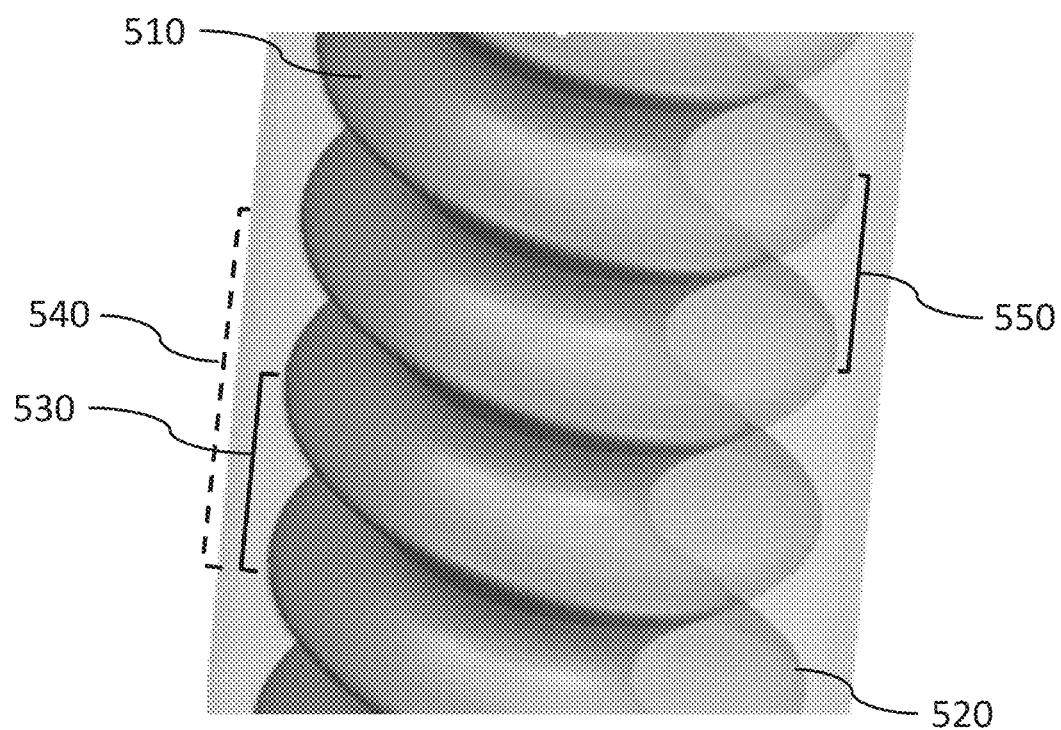
FIG. 5 illustrates a portion of a rotor-stator assembly, showing a helical rotor disposed inside a translucent helical stator.

FIG. 5 illustrates an example of a portion of a machine such as illustrated in FIGS. 2A-2C, showing a helical rotor 510 disposed inside a translucent helical stator 520. The pitch of the rotor (distance between adjacent threads or crests) is indicated by distance 530, and the lead of the rotor is indicated by distance 540. Because the rotor is a double-start helix, the lead is twice the pitch. The pitch of the stator is indicated by distance 550 and, because the stator is a single-start helix, distance 550 is also the lead of the stator. The rotor pitch 530 and stator pitch 550 are the same. In some embodiments the rotor and stator are plastic. In other embodiments of the rotary machines described herein both the rotor and stator can be metal. In other embodiments, depending on the application, the rotor and/or stator can be made from ceramic, elastomeric or other suitable materials or combinations of materials. The material(s) of the rotor can be the same as, or different from, the material(s) of the stator.

In the embodiment illustrated in FIGS. 2A-2C, the rotor and stator surfaces bound one complete chamber or volume per envelope revolution (each volume constituting a single stage of the machine or pump). The boundaries of these chambers are simple helices at the "top" and "bottom" (the path of the hypotrochoid generating elements, or "points" on the envelope), and a contact curve between the rotor and stator in the "clockwise" and "counter-clockwise" direction. These chambers do not change size or shape as the device operates. The material to be pumped (typically a fluid) is moved in an axial direction through the pump, and the flow velocity is substantially constant.

There is a quasi-helical contact path between the rotor and the inner "ridge" (or crest) of the stator at all times during rotation of the rotor (just as there is contact between the rotor and the inverse apex in the stator in the machine illustrated in FIGS. 1A-1G). The contact path with the stator moves or oscillates back and forth across the helical "ridge" or crest of the rotor as the rotor rotates relative to the stator (in a manner similar to how the contact point moves back and forth across the tips of elliptical rotor in the machine of FIGS. 1A-1G). The rotor-stator contact path revolves around the machine as pumping action proceeds, "threading" the fluid (or material to be pumped) in a spiral path along the helix, to that it is moved axially from one end of the stator cavity to the other.

Thus, the periodicity of contact between the helical rotor and stator occurs in space (moving along a continuous contact path over time) rather than in time (with intermittent contact between surfaces such as occurs, for example, in the machine illustrated in FIGS. 1A-1G, where the rotor tips only intermittently contact the inverse apex on the stator).

Thus, in the present rotary machines, rather than periodically engaging and disengaging (or touching and separating), the contact surfaces and any associated seals slide across one another, or in close proximity to one another, continuously. This continuous contact line between rotor and stator can facilitate the provision of sealing in embodiments of the present machines.

Some embodiments of the present rotary machines operate with a small clearance between the helical rotor and stator, but without seals between them. In some embodiments it can be desirable to dispose a seal between these components to reduce leakage of fluid between stages.

Figure 6A:
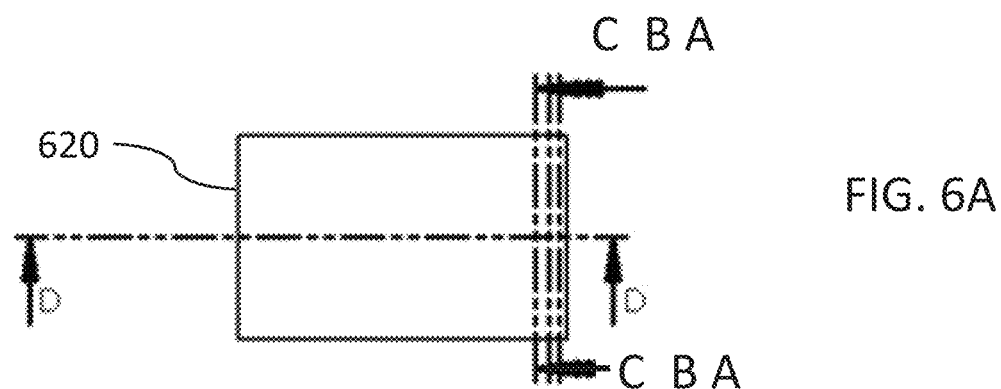
FIG. 6A shows a side view of a rotor-stator assembly showing an outer cylindrical surface of the stator.
Figure 6B:
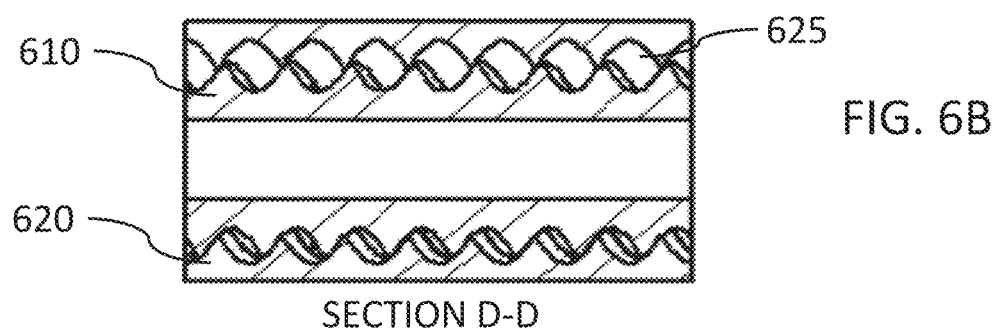
FIG. 6B is a cross-sectional view of the rotor-stator assembly of FIG. 6A, showing a helical rotor disposed within a helical stator cavity.
Figure 6C:
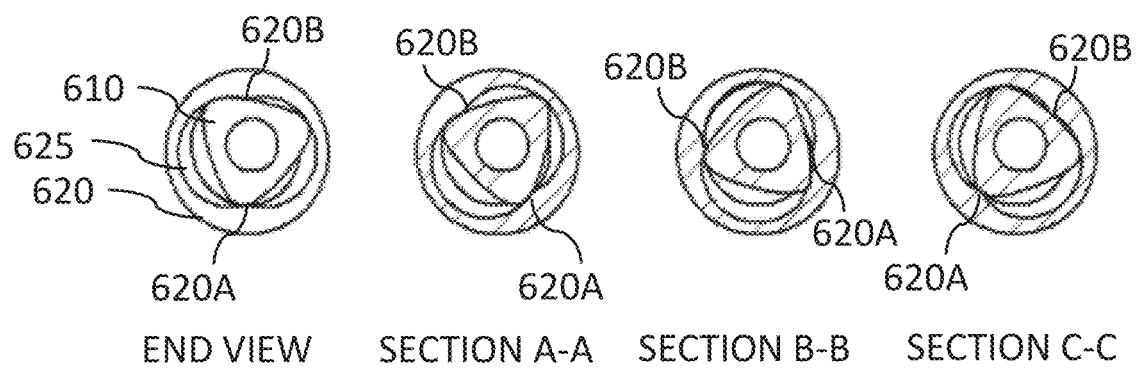
FIG. 6C shows an end view and various cross-sectional views taken in the direction of arrows A-A, B-B and C-C in FIG. 6A, showing the helical rotor with a three-lobe transverse cross-section.

FIGS. 6A-C illustrate another embodiment of a machine according to the present approach, where in cross-section, the helical trochoidal rotor has three lobes and the stator cavity has two lobes. The rotor and stator cavity are defined by sweeping these profiles along a helical path. This embodiment has a rotor/stator lead ratio of 3:2. FIG. 6A shows a side view of a cylindrical stator 620. FIG. 6B is a cross-sectional view taken in the direction of arrows D-D in FIG. 6A, and shows a helical rotor 610 disposed within stator cavity 625 defined by stator 620. FIG. 6C shows an end view and various cross-sectional views taken in the direction of arrows A-A, B-B, and C-C in FIG. 6A. Rotor 610 has rounded triangular transverse cross-section, as shown in FIG. 6C. Stator cavity has a transverse cross-sectional profile that is roughly circular with two inverse apex regions, 620A and 620B swept along a helical path. As one moves along the axis of rotation of rotor 610, the cross-sectional profile of the rotor and stator progresses in a manner as shown in FIG. 6C.

Figure 7A:
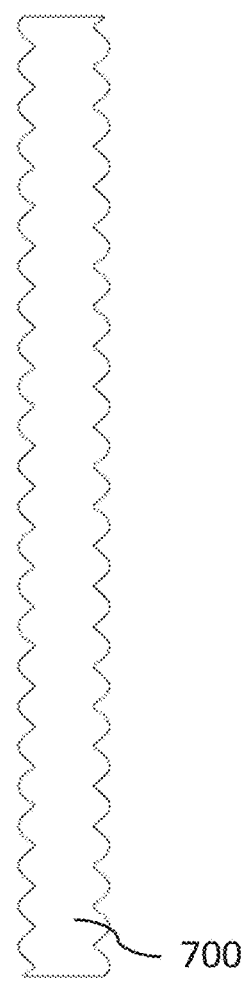
FIG. 7A is a side view of a helical rotor with a three-lobe transverse cross-section.
Figure 7B:
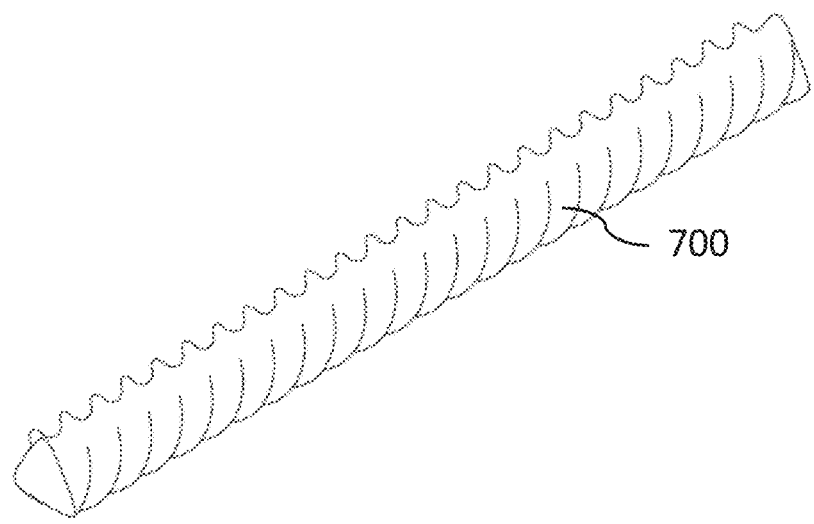
FIG. 7B is an isometric view of the helical rotor of FIG. 7A.

FIG. 7A is a side view of a helical rotor 700 (with a 3-lobe, rounded triangular transverse cross-section) similar to rotor 610 of FIGS. 6A-C. FIG. 7B is an isometric view of rotor 700.

Figure 8A:
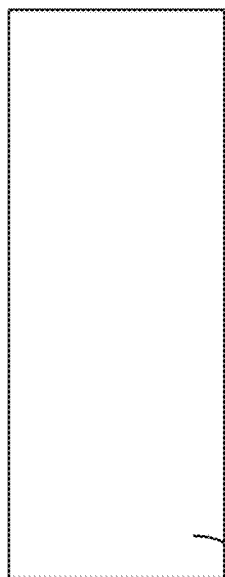
FIG. 8A is side view of a stator with a helical cavity, showing an outer cylindrical surface of the stator.
Figure 8B:
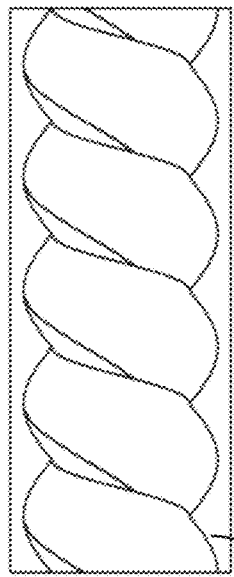
FIG. 8B is a longitudinal cross-sectional view of the stator of FIG. 8A.
Figure 8C:
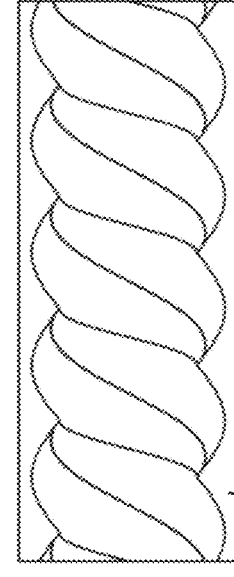
FIG. 8C is another longitudinal cross-sectional view of the stator of FIG. 8A orthogonal to the cross-sectional view of FIG. 8B.
Figure 8D:
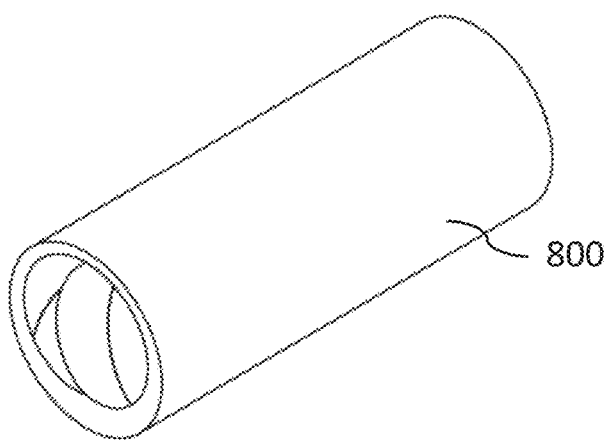
FIG. 8D is an isometric view of the stator of FIG. 8A.

FIG. 8A is side view of a 2-lobe stator 800. FIG. 8B is a longitudinal cross-sectional view of stator 800, and FIG. 8C is another longitudinal cross-sectional view of stator 800 (orthogonal to the cross-sectional view of FIG. 8B). Both FIGS. 8B and 8C show the inner surface of the stator cavity. FIG. 8D is an isometric view of stator 800. Stator 800 is similar to stator 620 of FIGS. 6A-C.

Figure 9A:
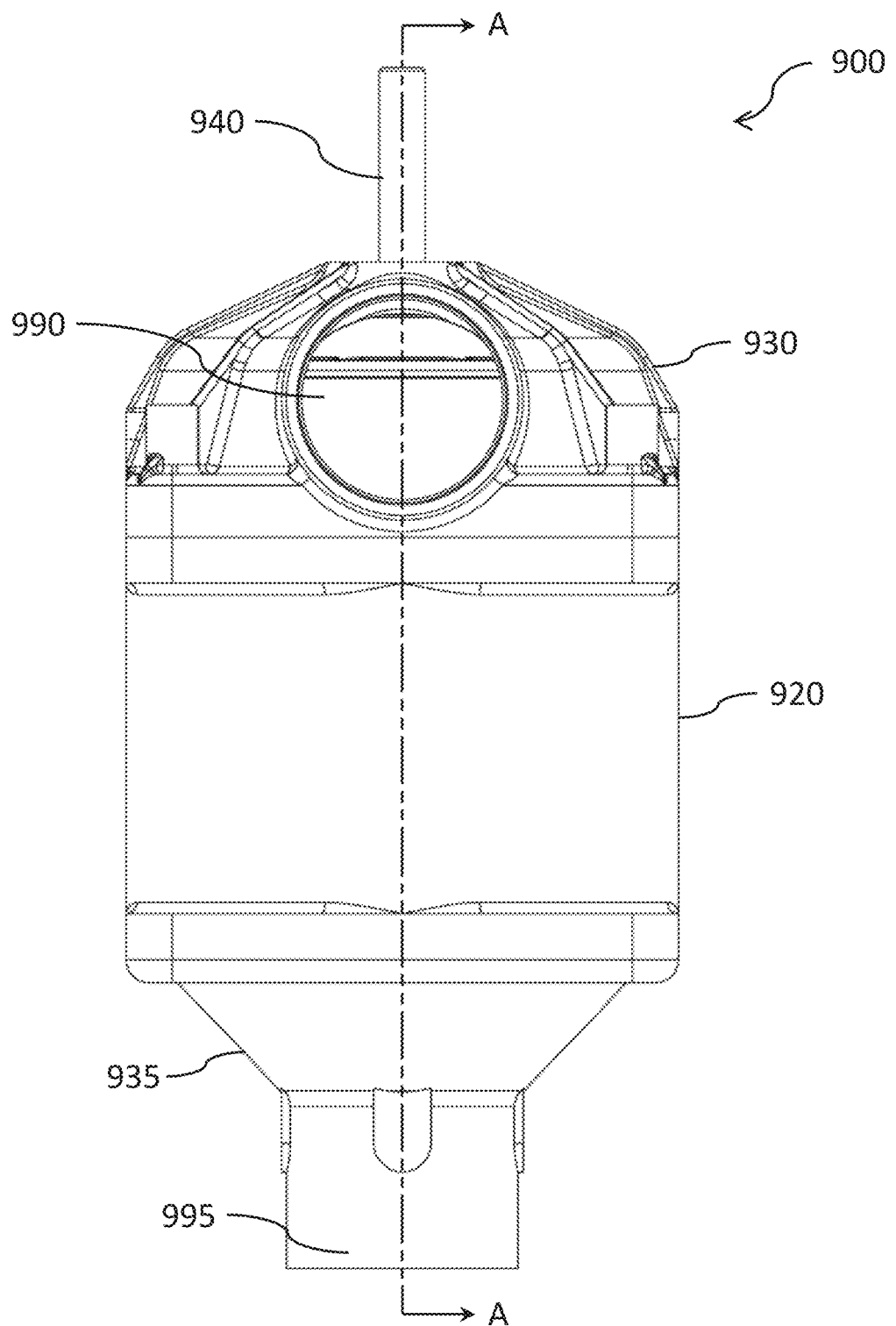
FIG. 9A is a side view of a rotary machine with a helical rotor-stator assembly having trochoidal geometry.
Figure 9B:
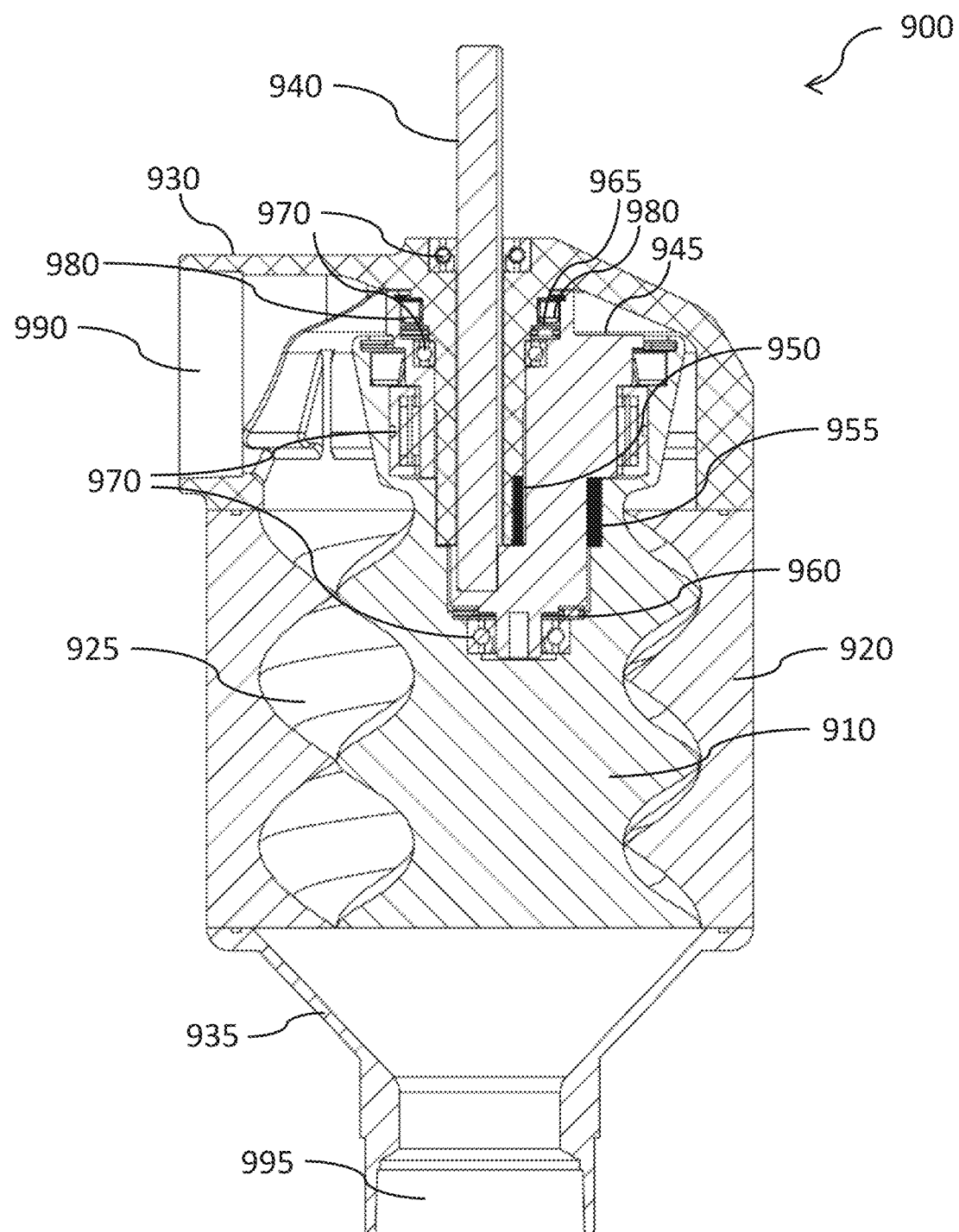
FIG. 9B is a cross-sectional view of the rotary machine of FIG. 9A, taken in the direction of arrows A-A in FIG. 9A.

FIGS. 9A and 9B illustrate an example of a rotary machine 900 with a helical rotor-stator assembly having trochoidal geometry. FIG. 9A is a side view of rotary machine 900, and FIG. 9B is a cross-sectional view taken in the direction of arrows A-A in FIG. 9A. Referring primarily to FIG. 9B, rotary machine 900 comprises helical rotor 910 and helical stator 920 defining stator cavity 925. Rotary machine 900 further comprises inlet housing 930 and outlet housing 935. Drive shaft 940 is fixed to carrier 945, and is mechanically coupled via sun gear 950 and ring gear 955 to cause eccentric rotation of rotor 910 within stator cavity 925. Rotary machine 900 further comprises thrust bearings 960 and 965, radial bearings 970 and shaft seals 980. As rotor 910 rotates with stator cavity 925, fluid can be drawn into rotary machine 900 via inlet port 990, and expelled via outlet port 995.

Most of the above description has focused on embodiments of helical trochoidal rotary machines with a trochoidal rotor (particularly an elliptical rotor) and corresponding outer envelope stator cavity. In other embodiments, helical trochoidal rotary machines can have an epitrochoidal stator cavity profile and corresponding rotor (inner envelope) profile that are each swept along helical paths. These embodiments have the same relative motion of the rotor and stator (with the same orbit and spin) as machines with a trochoidal rotor and corresponding outer envelope stator cavity.

The present approach can be applied to generate embodiments of helical rotary machines based on a hypotrochoidal or epitrochoidal rotor (with the corresponding stator cavity profile being the outer envelope or inner envelope, respectively of the rotor as it undergoes planetary motion), where the components have more than two or three lobes. Such machines will have more chamber "edge" for each trapped volume of fluid, so may tend to have more leakage per stage, poorer solids handling capability, and/or higher friction if dynamic seals are used. However, for some applications, for example mud motors, such embodiments with lower speed and higher torque can offer advantages.

In the rotary machines described herein, the rotor (and/or optionally the stator) can be rotated using any suitable drive mechanism. Some non-limiting examples of drive mechanisms are briefly discussed below.

The fundamental working principal is independent of which component of the machine (if any) is "fixed" and which is rotating. For example, in some embodiments the machine can be operated such that the rotor and stator each revolve around their respective centers (an inherently balanced design). In such embodiments, even though both components are rotating about their axes, the relative motion of the components is basically the same as in fixed stator embodiments. In some embodiments, for example, the machine can be operated such that the stator is fixed and the rotor undergoes planetary motion within it. This is mechanically simple and compact, but sometimes requires counterweights to provide balance. In other embodiments, the outer stator (or housing) undergoes planetary motion about the inner rotor. Other variations are possible.

For 2:1 (rotor:stator lobe) rotary machines with hypotrochoidal rotor with outer envelope stator cavity, or epitrochoidal stator with inner envelope rotor, an example of a suitable drive mechanism has an external gear fixed to the stator meshing with an internal gear with twice as many teeth fixed to the rotor, the distance between the gear centers being equal to the eccentricity of the hypotrochoid, that center distance being maintained by bearings fixed to each part and interacting with an element that revolves with the rotor center; the revolving element being driven by a shaft passing through the sun gear. This type of mechanism is known, and used for instance in Wankel rotary engines. Alternatively, instead of using an internal gear a pair of external gear meshes can be used to achieve a 2:1 gear ratio with the output rotating in the same direction as the input.

For machines with other ratios, the gear ratio can be modified accordingly. In a machine having a three lobe rotor and a two lobe stator, the gear ratio is 3:2. In general, for a machine having an (n+1) lobe rotor and an n lobe stator, the gear ratio can be (n+1):n. For epitrochoid with outer envelope or hypotrochoid with inner envelope machines, the gears can be fixed to the corresponding component, for example, the external gear can be fixed to the rotor and the internal gear can be fixed to the stator.

Other drive mechanisms that do not involve gears can be used. For example, some embodiments are rotary machines in which the rotor is mounted to a flexible or angled shaft (for example, fitted with universal joints) so that it rotates eccentrically, and power is transmitted from the concentric rotation of one end of the drive shaft to the eccentrically rotating rotor. Thus, the shaft can be coupled to and driven by a motor, with the stator acting as a guide for the rotor. Other examples use, for example, Schmidt couplings and/or cycloidal drive mechanisms, in lieu of gears, to provide the relative motion of the rotor and stator.

It is possible to make a machine based on the present approach with a helical rotor and stator having a single stage, multiple stages or, in some embodiments, with less than a complete stage (where there is no complete trapped chamber or volume of fluid between the ends of the pump). For the latter, end plates can be provided at each end of the rotor-stator, with an inlet port provided in one end plate and an outlet port in the other. If somewhat more than one complete rotor revolution is provided (i.e. sufficient length and number of rotor pitches that at least one bounded volume of fluid is isolated from both ends of the pump simultaneously), end plates may not be needed.

In multi-stage embodiments of the present machines as described above, if the rotor-stator geometry remains substantially constant along the axis of the machine, the volume and dimensions of the bounded volumes or fluid chambers formed between the helical rotor and the stator will be the same, and the volume of each fluid chamber will remain constant during operation of the machine, as the rotor rotates within the stator. This is explained further in reference to FIG. 10.

Figure 10:
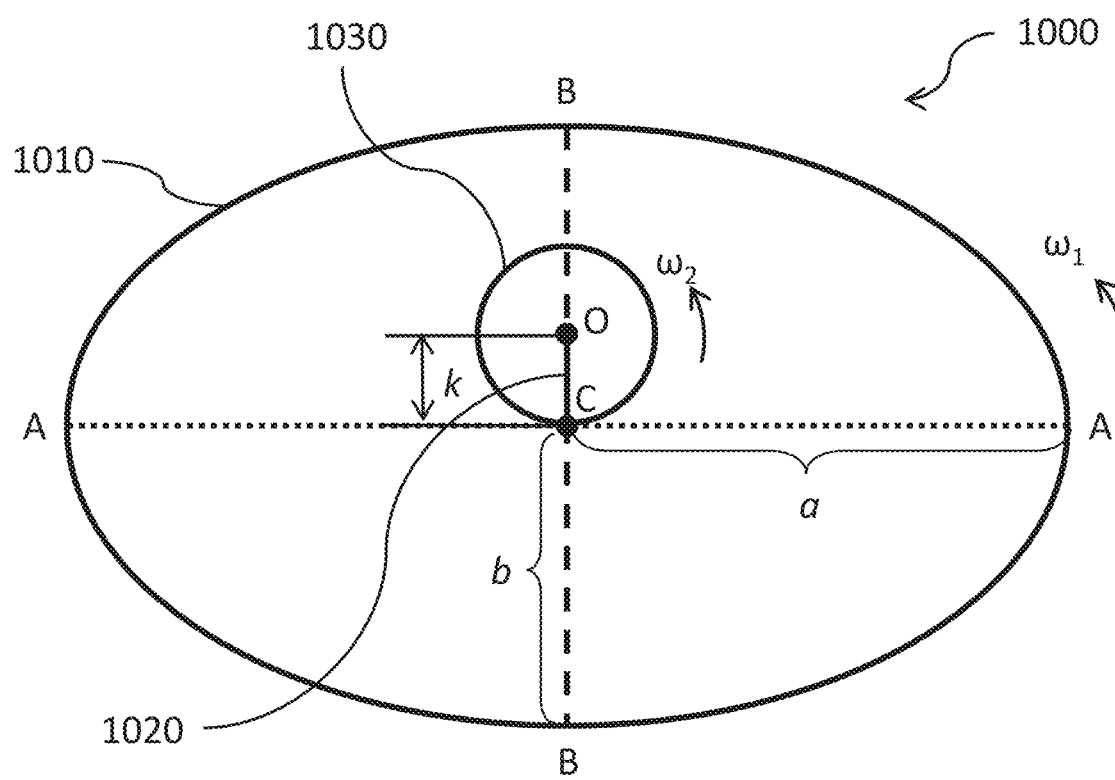
FIG. 10 is a schematic diagram illustrating the geometry of an ellipse rotating about the head of a rotating radial arm.

FIG. 10 is a schematic diagram illustrating the geometry of an ellipse rotating about the head of a rotating radial arm. In geometric configuration 1000, ellipse 1010 has a center C, a major axis indicated by dotted line A-A and a minor axis indicated by dashed line B-B. Major axis A-A is the longest diameter of ellipse 1010, and minor axis B-B is the shortest diameter of ellipse 1010. Ellipse 1010 rotates about center C at an angular velocity $\omega_1$ in a counter-clockwise direction relative to a frame of reference in which center C is stationary. Center C is located at the head of a rotating radial arm 1020. Radial arm 1020 has length k and rotates about a fixed end O at an angular velocity $\omega_2$ in a counter-clockwise direction relative to a frame of reference in which fixed end O is stationary. If angular velocity $\omega_1$ is negative, it indicates that rotation of ellipse 1010 about center C is in a clockwise direction relative to a frame of reference in which center C is stationary. If angular velocity $\omega_2$ is negative, it indicates that rotation of radial arm 1020 about fixed end O is in a clockwise direction relative to a frame of reference in which fixed end O is stationary.

Circle 1030 is the locus of the head of radial arm 1020 as it rotates about fixed end O. Line O-C is also referred to as the crank arm, and length k is referred to as the crank radius.

Geometric configuration 1000 can represent a helical rotor assembly in transverse cross-section. In embodiments of the rotary machines as described herein, it is desirable that inverse apex (or ridge or crest) of the corresponding helical stator is in contact with the outer surface of helical elliptical rotor at all times during a complete revolution of elliptical rotor. This can be achieved by configuring the geometry 1000 such that the difference between the semi-major axis of the rotor with elliptical cross-section (shown in FIG. 10 as length "a") and the semi-minor axis of the rotor (shown in FIG. 10 as length "b") is twice the crank radius, k. In other words, in preferred embodiments:

$$a-b=2k$$

If the rotor and stator pitch and all dimensions (including a, b and k as shown in FIG. 10) remain constant along the length of the rotor-stator assembly, then the volume and dimensions of the fluid chambers formed between the helical rotor and the stator will be the same along the length of the assembly. Such rotary machines can be used, for example, as pumps and, if driven at constant speed can provide a fairly steady volumetric flow rate or output.

In other multi-stage embodiments, the rotor-stator geometry can be varied, in a continuous or stepwise manner, along the axis of the rotary machine. In some embodiments, such variations can cause the volume of the fluid chambers to vary along the axis of the machine, such as may be desirable for compressor or expander applications, for example. In other embodiments, it can be advantageous to vary the geometry of the rotor-stator along the axis of the rotary machine, while keeping the volume of the fluid chambers formed between the helical rotor and the stator approximately the same along a length of the rotor-stator assembly. Such embodiments are described in further detail below, again with reference to FIG. 10.

Instead of the rotor and stator pitch and other parameters (including a, b and k) being constant along the axis of the machine, the rotor-stator geometry can be varied along the axis of a rotary machine, for example, as follows:

(1) By varying the pitch of the rotor and stator. For example, the pitch can increase in the flow direction so that the volume of the fluid chambers increases along the axis of the machine. This may be desirable for compressor applications, for example.

(2) By varying the aspect ratio of the rotor (a/b) and keeping crank radius, k, constant, where a minus b remains equal to 2 k. The corresponding stator profile is varied along its axis accordingly.

(3) By varying the crank radius k, where a minus b remains equal to 2 k. This involves also changing the aspect ratio of the rotor by varying at least one of dimensions a or b. The corresponding stator profile is varied along its axis accordingly. When the crank radius is varied the rotor and stator axes will be inclined relative to one another (i.e. be non-parallel).

(4) By varying the degree of offset of the rotor from a true ellipse (or hypotrochoid) along the axis of the rotor, and correspondingly varying the stator profile along its axis.

In some embodiments, varying one or more of these parameters can cause the volume of the fluid chambers to vary along the axis of the machine, for example, getting smaller or larger. In some embodiments, the parameters are varied so that the size of the elliptical rotor cross-section and corresponding stator is scaled or reduced linearly in the axial direction.

In some embodiments, different rotor-stator geometries or profiles can be used in different portions or segments of the machine to meet various requirements. For example, a "precompressor" section with different dimensions but equal or slightly greater displacement can be used to reduce Net Positive Suction Head (NPSH) requirements in a pump. A different geometry that is more favorable for sealing can be used downstream along the main body of the pump. In another example, a tapered embodiment can be used as a nozzle or diffuser.

In some embodiments, multiple parameters can be varied in combination so that the volume of fluid chambers formed between the helical rotor and the stator remains approximately the same along a length of the rotor-stator assembly, with the variation of one parameter at least partially compensating for the variation in another parameter with respect to the effect on the volume of the fluid chambers. For example, variations described in (2) and (3) may change the flux area, but the change in flux area could be compensated for by, for example, increasing the rotor-stator pitch. It can be advantageous to manipulate other characteristics by having a different geometry in one section of the rotor-stator assembly than in another section, even if the fluid throughput along the length is roughly or substantially constant. For example, it could be desirable to have a high flux area near the intake (to draw a fluid in and encapsulate it), and then gradually change the geometry towards the discharge end.

Figure 11:
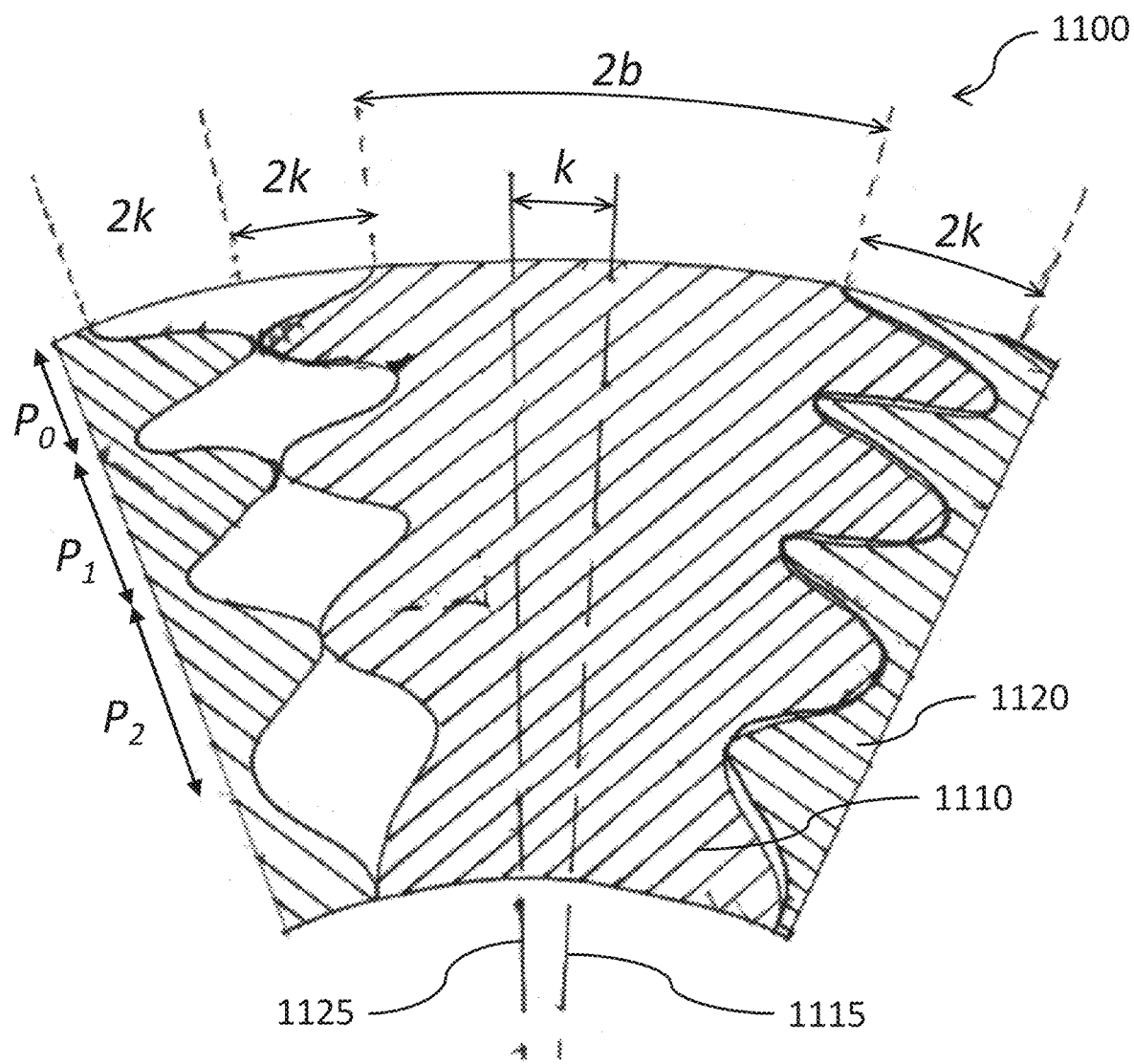
FIG. 11 is a cross-sectional diagram illustrating a portion of a rotor-stator assembly of a rotary machine.

FIG. 11 is a sketch illustrating a portion of a rotor-stator assembly 1100 in cross-section, to illustrate an embodiment in which, multiple parameters are varied in combination so that the volume of the fluid chambers formed between a helical rotor 1110 and a corresponding stator 1120 remains approximately the same along a length of the rotor-stator assembly. In this embodiment, the rotor and stator axes are non-parallel. When the rotor and stator axes are non-parallel, instead of being mapped on to plane that is perpendicular to both axes, the "cross-sectional" profile of the rotor and stator is mapped on to the surface of a sphere which is perpendicular to both axes (the center of sphere being the point at which the rotor axis 1115 and stator axis 1125, if extrapolated, would intercept).

The crank radius, k, is the arc length (on the surface of the sphere at that point along the axes) between the longitudinal axis 1115 of rotor 1110, and the longitudinal axis 1125 of stator 1120. Crank radius, k, is varying along the length of the assembly (decreasing toward the lower end of the illustrated assembly), and the rotor and stator longitudinal axes 1115 and 1125 are non-parallel. The length of minor transverse axis of the elliptical rotor 1110 mapped onto the sphere is shown in FIG. 11 as 2 b. As in FIG. 10 where a–b=2 k, at any point along the length of rotor-stator assembly 1100 in FIG. 11 the major transverse axis (2 a) of the elliptical rotor 1110 (mapped onto the sphere) is 2 b+4 k. In the embodiment illustrated in FIG. 11, the crank radius k and the dimensions of the rotor and corresponding stator are continuously scaling or decreasing along a length of the assembly so that the rotor and stator transverse profiles at any axial position differ only in their size. The pitch of the rotor and stator can be correspondingly increased, so that the volume of the fluid chambers formed between rotor 1110 and stator 1120 remains approximately the same along the length of the rotor-stator assembly. In the embodiment of FIG. 1, the pitch is varied continuously, and the pitch between various pairs of points along the length of the assembly is shown gradually increasing, from $P_0$ to $P_1$ to $P_2$. To maintain constant chamber volume in the case described, instantaneous pitch at any point is inversely proportional to the square of the distance to that point from the center of the sphere (zero eccentricity point). Without such a change in pitch, the volume of fluid chamber would decrease, and such a machine could be used as a compressor, for example.

The changes in geometry can be continuous or gradual or there can be a step change. If the latter, preferably the eccentricity of the pump remains constant so that single rotor and stator parts can be used throughout the machine, and two or more rotor sections can be driven as a single component. In embodiments with a step change, it can be desirable to provide a space or chamber between the sections where the fluid can switch between flow paths. The pressure in this intermediate space is preferably slightly positive, to reduce the likelihood of cavitation. In some embodiments this can be achieved by providing a slightly smaller displacement in the upstream section. Alternatively, slip caused by pressure differential across the pump can provide this positive pressure. It can further be desirable in some instances to provide a pressure relief device in the intermediate space to control load on the upstream pump section and/or "motoring" of the downstream pump section.

In variations on the helical trochoidal rotary machines described herein, the rotor and stator profiles can be offset along the normals of their planar transverse cross-sections. For example, in some such embodiments where the rotor is hypotrochoidal and undergoes planetary motion within a stator that is shaped as an outer envelope of that rotor, the rotor and stator can have cross-sectional profiles that are inwardly offset. In other embodiments where the stator is epitrochoidal, and the rotor undergoes planetary motion within the stator and is shaped as the inner envelope of that stator, the rotor and stator can have cross-sectional profiles that are outwardly offset. Such variations in geometry can offer additional advantages, while still retaining at least some of the benefits provided by helical trochoidal rotary machines.

Figure 12:
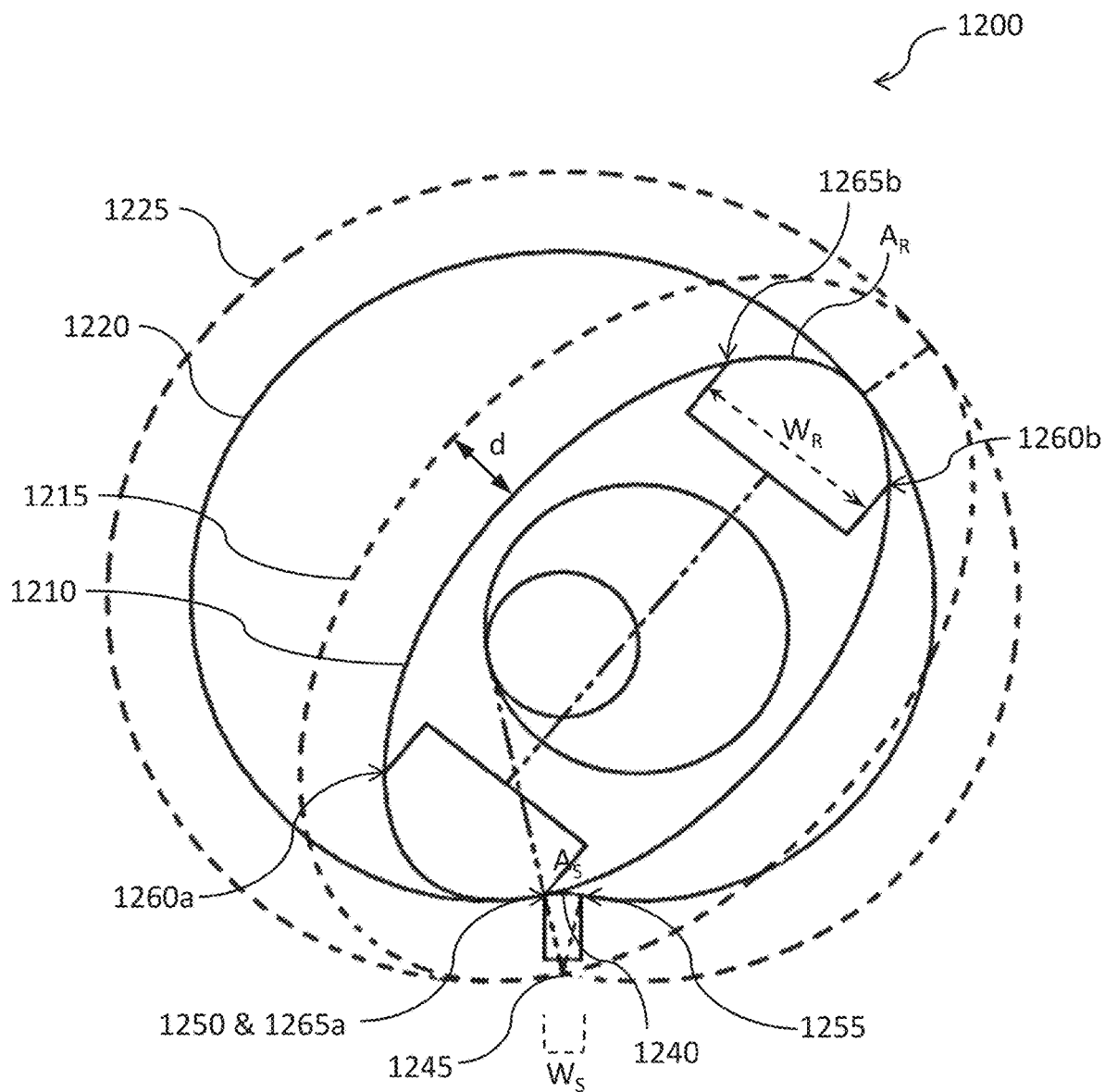
FIG. 12 is a transverse cross-sectional diagram illustrating rotor-stator geometry for a rotor that has a cross-sectional profile that is inwardly offset from each point on an ellipse, and a correspondingly offset stator cavity profile.

FIG. 12 is a transverse cross-sectional diagram of a rotor-stator assembly 1200, in which a rotor has a cross-sectional profile 1210 that is inwardly offset from each point on an ellipse 1215 by a fixed distance "d" measured perpendicular to a tangent to ellipse 1215 at that point. The resulting rotor profile 1210 is not a true ellipse. The corresponding stator cavity profile 1220 can be defined as the outer envelope generated when rotor profile 1210 undergoes planetary motion, or defined as the correspondingly inward offset of the envelope 1225 generated by the non-offset hypotrochoid (ellipse 1215).

Referring again to FIG. 12, with this "offset" geometry, the inverse apex region 1240 of stator is rounded with a circular arc, centered on the inverse apex 1245 of the "non-offset" geometry. In the plane of the diagram, the contact between inverse apex region 1240 of the stator and the rotor tips is continuous, but moves back and forth along the circular arc of the inverse apex region between points 1250 and 1255. The distance between these points along the circular arc is the stator arc length ($A_S$), and the shortest distance between these two points is the sweep width ($W_S$) of the inverse apex region. On the rotor, contact with the inverse apex region 1240 of the stator occurs between points 1260a and 1265a on one rotor tip and between points 1260b and 1265b on the other rotor tip. The distance between points 1260a and 1265a (or 1260b and 1265b) around the rotor is the rotor arc length ($A_R$), and the shortest distance between these two points is the sweep width ($W_R$) of the rotor For a helical rotor-stator assembly, contact between the rotor and stator occurs along curves that are the locus of contact points between the rotor and stator in each transverse "cross section". For non-offset trochoid generating points in the envelope (i.e. the stator "inverse apex" of a hypotrochoid with outer envelope, or the "rotor tips" of an epitrochoid with inner envelope), this locus is a true helix. For offset trochoid generating points, the contact point moves across the arc length of the stator or rotor. This contact curve deviates from the true helix, but is visually substantially similar.

The locus of contact points between trochoid and envelope is more complex; in most embodiments, it sweeps across a substantially longer arc, so the contact path is a distorted helix. It is then "interrupted" as the contact point crosses the trochoid generating point. The resulting contact curves are discrete segments, roughly helical in appearance, but not true helices. These have a different slope than the continuous curve of the trochoid generating contact, and "bridge" points on that contact to form closed chambers.

Figure 13A:
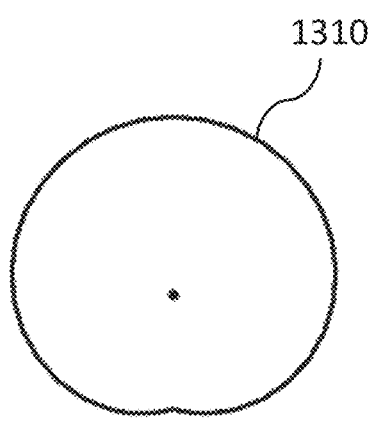
FIG. 13A shows the cross-sectional shape of a helical stator cavity with no offset, in a plane normal to a longitudinal access of the stator.
Figure 13C:
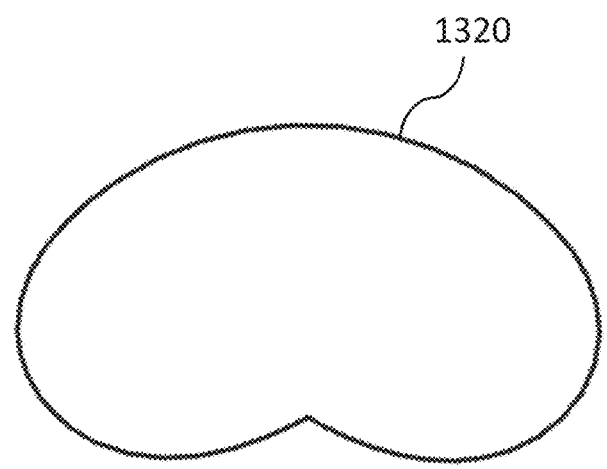
FIG. 13C shows the cross-sectional shape of the stator cavity of FIG. 13A in a plane normal to the helical path of the stator inverse apex.
Figure 13B:
FIG. 13B shows a close up view of the inverse apex of the helical stator cavity of FIG. 13A, from the same angle as FIG. 13A.
Figure 13D:
FIG. 13D shows a close up view of the helical stator cavity of FIG. 13B from the same angle as FIG. 13C.

FIG. 13A shows the cross-sectional shape 1310 of a helical stator cavity with no offset (such as the stator cavity 410 of FIGS. 4B and 4C) in a plane normal to a longitudinal access of the stator. FIG. 13B shows a close up view of the inverse apex region from the same angle as FIG. 13A. FIG. 13C shows the cross-sectional shape 1320 of the same stator cavity in a plane normal to the helical path of the stator inverse apex. FIG. 13D shows a close up view of the inverse apex region from the same angle as FIG. 13C. In this cross-section the tip or peak of the inverse apex is much sharper (the angle is more acute). More broadly, when a given planar profile is used to generate a helical pump, the apex becomes narrower and sharper in at least one direction. Practically, having an interior surface of the stator defining such a sharp helical thread or crest (which is also a continuous contact line with the rotor) can be problematic. Such a sharp feature can be subject to rapid wear, and can be fragile and prone to breakage.

Figure 14A:
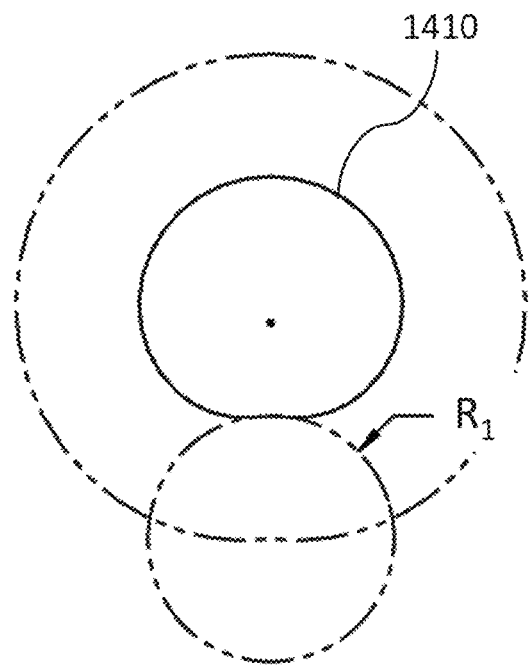
FIG. 14A shows the cross-sectional shape of a helical stator cavity, in a plane normal to a longitudinal access of the stator, for a stator with an inward offset.
Figure 14C:
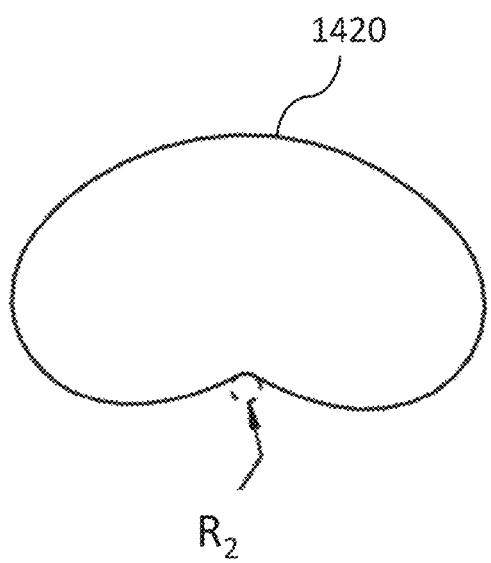
FIG. 14C shows the cross-sectional shape of the stator cavity of FIG. 14A in a plane normal to the helical path of the stator inverse apex region.
Figure 14B:
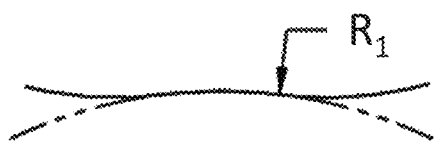
FIG. 14B shows a close up view of the helical stator cavity of FIG. 14A from the same angle as FIG. 14A.
Figure 14D:
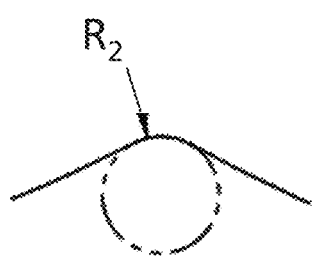
FIG. 14D shows a close up view of the inverse apex region from the same angle as FIG. 14C.

FIG. 14A shows the cross-sectional shape 1410 of a helical stator cavity in a plane normal to a longitudinal access of the stator, for a stator with a similar size to that of FIGS. 13A-B but with an inward offset (as described in reference to FIG. 12). FIG. 14B shows a close up view of the inverse apex region from the same angle as FIG. 14A. From this viewpoint, the inverse apex region defines a circular arc with the radius of circle $R_1$. FIG. 14C shows the cross-sectional shape 1420 of the same stator cavity (with inward offset) in a plane normal to the helical path of the stator inverse apex region. FIG. 14D shows a close up view of the inverse apex region from the same angle as FIG. 14C. The inverse apex region defines a non-circular arc that has a minimum radius of curvature that is the radius of a circle $R_2$. Circle $R_2$ has a much smaller radius than circle $R_1$ (again, in this cross-section, the feature is sharper). Nonetheless, a stator with an offset geometry defines an inwardly protruding helical thread or crest that is less sharp than in a helical stator of similar dimensions but with no offset.

Figure 15A:
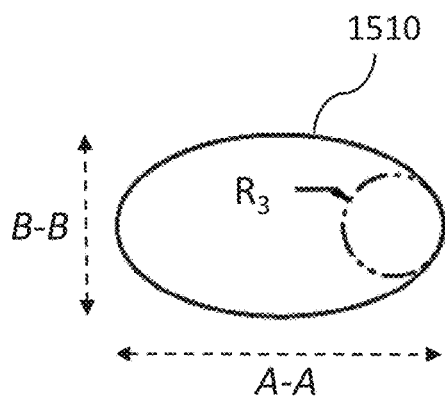
FIG. 15A shows the cross-sectional shape of a helical elliptical rotor with no offset, in a plane normal to a longitudinal access of the rotor.
Figure 15B:
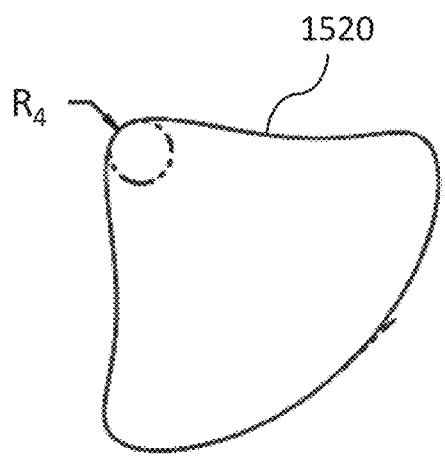
FIG. 15B shows the cross-sectional shape of the rotor of FIG. 15A in a plane normal to the helical path of the rotor tips.

FIG. 15A shows the cross-sectional shape 1510 of a helical hypotrochoidal rotor, in a plane normal to a longitudinal access of the rotor. The rotor has no offset (it is a true ellipse in cross-section), and corresponds to stator cavity shown in FIG. 13A. The tips of the rotor have a minimum radius of curvature that is the radius of circle $R_3$. FIG. 15B shows the cross-sectional shape 1520 of the rotor in a plane normal to the helical path of the rotor tips. In this projection, the threads or crests of the helical rotor have a minimum radius of curvature that is the radius of circle $R_4$. The radius of circle $R_4$ is much smaller than the radius of circle $R_3$.

Figure 16A:
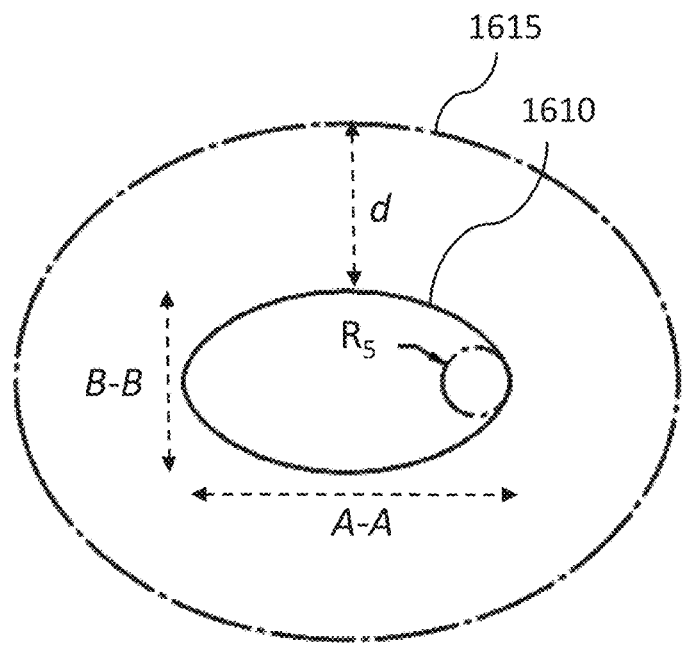
FIG. 16A shows the cross-sectional shape of a helical rotor with an offset, in a plane normal to a longitudinal access of the rotor.
Figure 16B:
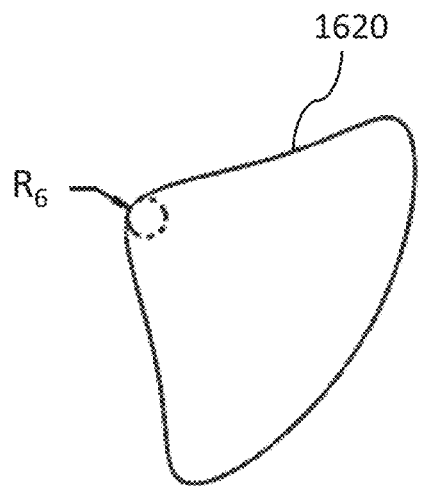
FIG. 16B shows the cross-sectional shape of the offset rotor of FIG. 16A, in a plane normal to the helical path of the rotor tips.

FIG. 16A shows the cross-sectional shape 1610 of a helical rotor in a plane normal to a longitudinal access of the rotor. The helical rotor in transverse cross-section has the same major diameter (A-A) and minor diameter (B-B) as the helical rotor of FIG. 15A, but is not a true ellipse. Its transverse cross-sectional shape 1610 is inwardly offset from each point on an ellipse (indicated by dashed outline 1615) by a fixed distance "d" measured normal to a tangent to the ellipse at each point on the ellipse. The offset rotor corresponds to the stator cavity illustrated in FIG. 14A. The tips of the offset rotor have a minimum radius of curvature that is the radius of circle $R_5$. Circle $R_5$ has a smaller radius than circle $R_3$. In other words the offset rotor is more "pointy" in transverse cross-section than a similarly sized elliptical (truly hypotrochoidal) rotor. FIG. 16B shows the cross-sectional shape 1620 of the offset rotor in a plane normal to the helical path of the rotor tips. At this angle, the crests of the helical rotor have a minimum radius of curvature which is the radius of circle $R_6$. Circle $R_6$ has a radius that is smaller than the radius of circle $R_5$, and much smaller than the radius of circle $R_4$.

Figure 17A:
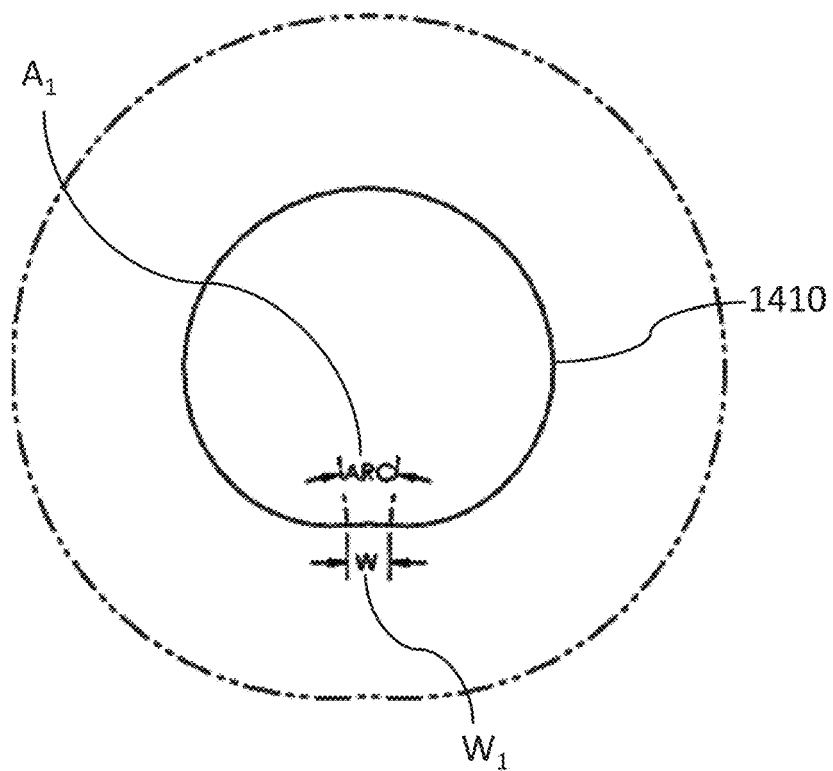
FIG. 17A shows the sweep width $W_1$ across the inverse apex region for a stator cavity with an offset, in a plane normal to a longitudinal access of the stator.
Figure 17B:
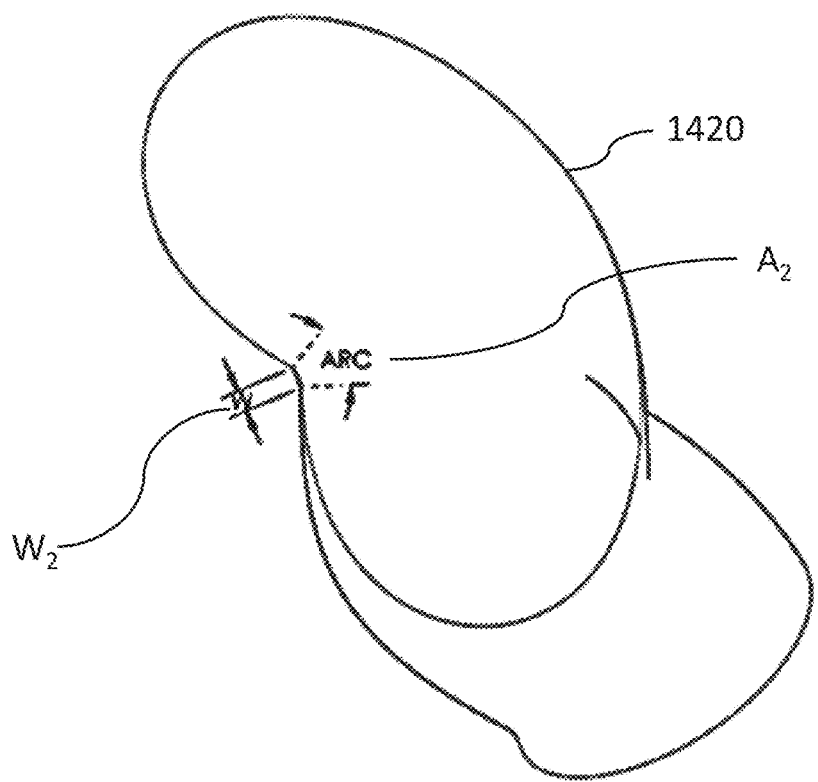
FIG. 17B shows the sweep width $W_2$ across the inverse apex region for the offset stator cavity of FIG. 17A, in a plane normal to the helical path of the stator inverse apex region.
Figure 18A:
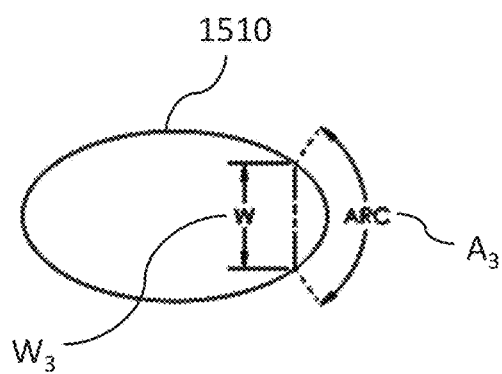
FIG. 18A shows the sweep width $W_3$ across the rotor tips for a rotor with no offset, in a plane normal to a longitudinal access of the rotor.
Figure 18B:
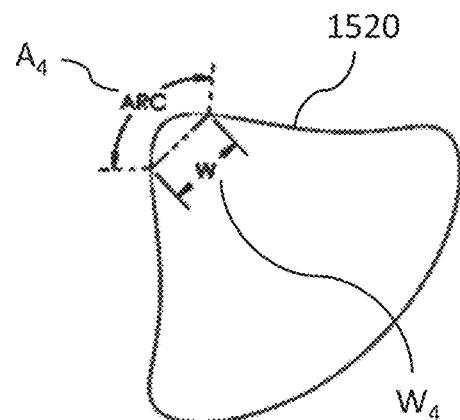
FIG. 18B shows the sweep width $W_4$ across the rotor tips for the elliptical rotor of FIG. 18A, in a plane normal to the helical path of the stator inverse apex region.
Figure 19A:
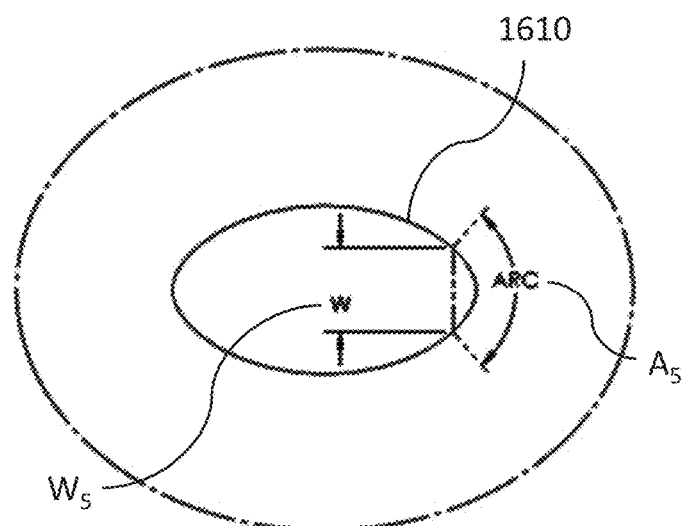
FIG. 19A shows the sweep width $W_5$ across the rotor tips for a rotor with an offset, in a plane normal to a longitudinal access of the rotor.
Figure 19B:
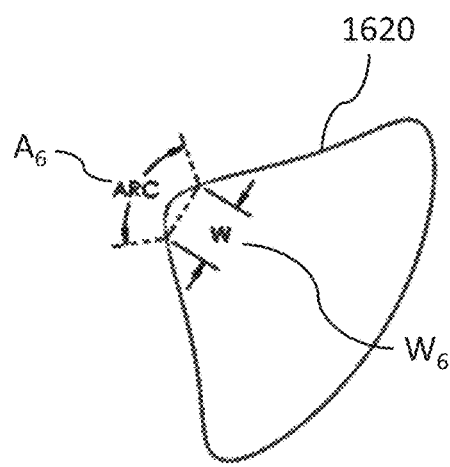
FIG. 19B shows the sweep width $W_6$ across the rotor tips for the rotor of FIG. 19A, in a plane normal to the helical path of the stator inverse apex region.

For the stator with no offset illustrated in FIGS. 13A-D, the sweep width across the inverse apex is infinitesimally small. FIG. 17A shows the sweep width $W_1$ across the inverse apex region for a stator cavity with an offset (same as in FIG. 14A), having cross-sectional shape 1410 in a plane normal to a longitudinal access of the stator. FIG. 17B shows the sweep width $W_2$ across the inverse apex region for the same stator cavity with cross-sectional shape 1420 (same as in FIG. 14C) in a plane normal to the helical path of the stator inverse apex region. FIG. 18A shows the sweep width $W_3$ across the rotor tips for an elliptical rotor with cross-sectional shape 1510 (same as in FIG. 15A) in a plane normal to a longitudinal access of the rotor. FIG. 18B shows the sweep width $W_4$ across the rotor tips for the same elliptical rotor with cross-sectional shape 1520 (same as in FIG. 15B) in a plane normal to the helical path of the stator inverse apex region. FIG. 19A shows the sweep width $W_5$ across the rotor tips for an offset rotor with cross-sectional shape 1610 (same as in FIG. 16A) in a plane normal to a longitudinal access of the rotor. FIG. 19B shows the sweep width $W_6$ across the rotor tips for the same rotor with cross-sectional shape 1620 (same as in FIG. 16B) in a plane normal to the helical path of the stator inverse apex region.

For the stator with no offset illustrated in FIGS. 13A-D, the arc length across the inverse apex is infinitesimally small. FIG. 17A shows the arc length $A_1$ across the inverse apex region for a stator cavity with an offset (same as in FIG. 14A), having cross-sectional shape 1410 in a plane normal to a longitudinal access of the stator. FIG. 17B shows the arc length $A_2$ across the inverse apex region for the same stator cavity with cross-sectional shape 1420 (same as in FIG. 14C) in a plane normal to the helical path of the stator inverse apex region. FIG. 18A shows the arc length $A_3$ across the rotor tips for an elliptical rotor with cross-sectional shape 1510 (same as in FIG. 15A) in a plane normal to a longitudinal access of the rotor. FIG. 18B shows the arc length $A_4$ across the rotor tips for the same elliptical rotor with cross-sectional shape 1520 (same as in FIG. 15B) in a plane normal to the helical path of the stator inverse apex region. FIG. 19A shows the arc length $A_5$ across the rotor tips for an offset rotor with cross-sectional shape 1610 (same as in FIG. 16A) in a plane normal to a longitudinal access of the rotor. FIG. 19B shows the arc length $A_6$ across the rotor tips for the same elliptical rotor with cross-sectional shape 1620 (same as in FIG. 16B) in a plane normal to the helical path of the stator inverse apex region.

In summary, the offset rotor has sharper features than the non-offset rotor, whereas the offset stator has a more rounded inverse apex region than the non-offset stator. For both the offset and non-offset components, the helicization makes the features sharper than they would be in a straight (non-helicized version) of the rotor-stator assembly. Because the lead of the stator is shorter than that of the rotor (by half in the case of a 2:1 rotor lobe: stator lobe rotary machine) the "sharpening" of the stator features upon helicization is more dramatic than for the corresponding rotor.

The degree of offset can be selected to give desirable relative rotor and stator profiles. In particular, the degree of offset can be selected to achieve a particular design objective that may offer practical advantages.

In one approach, the offset geometry can be selected based on the radius of curvature of the outwardly protruding thread or crest of the rotor relative to the radius of curvature of the inwardly protruding inverse apex region (or thread or crest) of the stator. In some embodiments, for example, the degree of offset may be selected so that circle $R_6$ in FIG. 16B (for the rotor) has about the same radius as circle $R_2$ in FIG. 14D (for the stator). Selecting the offset geometry of the stator-rotor assembly so that these radii are approximately or precisely matched, can assist with balancing stresses in the rotary machine, and improving durability. If there is a big discrepancy between these radii, one component may be more subject to failure than the other. For example, with a very small or no offset the inwardly protruding thread or crest of the stator will be very sharp. If, during operation of the rotary machine there is a large contact load between the rotor and stator along their contact lines, the fragile stator thread or crest may be prone to breakage or excessive wear. It may be possible to improve the durability of the rotor-stator assembly by using an offset geometry to increase the minimum radius of curvature of the stator thread or crest so that it is the same as or even greater than the minimum radius of curvature of the rotor thread or crest (when viewed in a plane normal to the helical threads).

In other embodiments, the degree of offset may be selected so that circle $R_5$ in FIG. 16A (for the rotor) has about the same radius as circle $R_1$ in FIG. 14B (for the stator).

In another approach, the offset geometry can be selected based on the relative sweep widths of the rotor and stator. In some embodiments, the degree of offset may be selected so that the sweep width on the helical rotor is about the same as the sweep width on the corresponding helical stator (in a plane normal to the helical paths of the rotor and stator, respectively), or so that the sweep width on the rotor is even less than on the stator. For example, the degree of offset may be selected so that sweep width $W_2$ in FIG. 17B for the stator is about the same as sweep width $W_6$ in FIG. 19B for the rotor. Consideration of relative rotor/stator sweep widths can be important, for example, if dynamic seals are used on the rotor and stator. If the sweep widths are the same or similar, for example, the rotor and stator seals can be made to be more similar in their properties. In embodiments of the rotary machines described herein that do include rotor and/or stator seals, the rotor seal width can be greater than, substantially the same as, or less than the rotor sweep width, and/or the stator seal width can be greater than, substantially the same as, or less than the stator sweep width. In some embodiments, it can be desirable that the rotor seal width is substantially the same as the rotor sweep width, and the stator seal width is substantially the same as the stator sweep width. In some of the latter embodiments, it can be desirable that the rotor seal width, rotor sweep width, stator seal width and stator sweep width are all substantially the same.

In other embodiments, the degree of offset may be selected so that sweep width $W_1$ in FIG. 17A for the stator is about the same as sweep width $W_5$ in FIG. 19A for the rotor.

In another approach, the offset geometry can be selected based on the relative arc lengths on the rotor and stator. For example, the degree of offset may be selected so that the arc length on the helical rotor is about the same as the arc length on the corresponding helical stator (in a plane normal to the helical paths of the rotor and stator, respectively), or so that the arc length on the rotor is shorter than on the stator. For example, the degree of offset may be selected so that arc length $A_2$ in FIG. 17B for the stator is about the same as arc length $A_6$ in FIG. 19B for the rotor. The relative rotor and stator arc lengths can be important, for example, in relation to the tendency of each component to be subject to wear. The component with the shorter arc length may be more subject to wear. It could be desirable to have the two components wear more evenly, or to have the component that is easier to repair or replace (typically the rotor) be the one which tends to wear more quickly. In embodiments of the rotary machines described herein that do include rotor and/or stator seals, the arc length of the rotor seal can be greater than, substantially the same as, or less than the arc length of the rotor, and/or the arc length of the stator seal can be greater than, substantially the same as, or less than the arc length on the stator. In some embodiments, it can be desirable that the arc length of the rotor seal width is substantially the same as the arc length on the rotor, and the arc length of the stator seal is substantially the same as the arc length on the stator. In some of the latter embodiments, it can be desirable that the arc length on the rotor, the arc length on the stator, the arc length of the rotor seal and the arc length of the stator seal are all substantially the same.

In other embodiments, the degree of offset may be selected so that arc length $A_1$ in FIG. 17A for the stator is about the same as arc length $A_5$ in FIG. 19A for the rotor.

The offset geometry of the stator-rotor assembly can also be selected so that the tendency for a fluid leak path to exist or form between the stator and rotor (at their various contact points) is reduced. For example, if fluid leakage is assumed to be a function of a separation distance between the rotor and stator as well as the length of a constricted path between rotor and stator, it is possible to adjust these variables to reduce the tendency for leakage. For non-offset embodiments, the leak path looks more like an orifice, whereas for offset embodiments, the leak path looks more like a pipe or channel.

For rotary machines based on a stator that is epitrochoidal and the rotor is shaped as the inner envelope of that stator, the rotor and stator can have cross-sectional profiles that are outwardly offset along the normals of their planar transverse cross-sections. Even though the offset is the other way around in such machines, the degree of offset can be selected based on similar considerations to those discussed above.

In other variations on the helical trochoidal rotary machines described herein, instead of being offset along the normals of their planar transverse cross-sections, the rotor and stator profiles can be offset along the normals of their outer or inner body surface, respectively. Geometrically, for example, this would be equivalent to adding a coating of substantially uniform thickness to the rotor or the inner surface of the stator, and removing a layer of substantially uniform thickness from the corresponding stator or rotor. For example, in embodiments where the rotor is hypotrochoidal and undergoes planetary motion within a stator that is shaped as an outer envelope of that rotor, the rotor profile can be inwardly offset in a manner equivalent to having a layer of substantially uniform thickness removed from the outer surface of the rotor, with the corresponding stator profile being inwardly offset in a manner equivalent to having a layer of substantially uniform thickness added to the inner surface or cavity of the stator. In other embodiments where the stator is epitrochoidal, and the rotor undergoes planetary motion within the stator and is shaped as the inner envelope of that stator, the rotor and stator can have cross-sectional profiles that are outwardly offset along the normals of their outer and inner surfaces, respectively, in a manner equivalent to adding a layer of substantially uniform thickness to the rotor and removing a layer of substantially uniform thickness from the inner surface or cavity of the stator.

Sealing in Helical Trochoidal Rotary Machines

There are various approaches to reducing leakage between the rotor and stator, and between stages, of rotary machines. In one approach, a simple tight fit of rotor and stator can reduce the tendency for leak paths. High tolerance manufacturing can be used, so that the components move in extremely close proximity to one another, however this approach is generally expensive and can be challenging for certain machine geometries or architectures. It can also be difficult to accommodate thermal expansion/contraction of the inner diameter of the stator and/or outer diameter of the rotor, for example. Such thermal expansion or contraction can increase the tendency for the leakage, or result in jamming or aggressive wear of the components during operation of the machine.

A flexible or elastomeric rotor and/or stator (or an elastomeric sleeve or liner) can be used to provide a resilient, interference fit between components, however such material can be subject to wear and/or may tend to degrade when in prolonged contact with a working fluid.

Abraded surfaces can be used to provide a tight tolerance fit, however such surfaces tend to have high wear rates with abrasive fluids, typically require a break-in period, and generally one of the surfaces must be made of softer material which can have limitations in certain applications.

As mentioned above, for the helical rotary machines described herein, the periodicity of contact between the helical rotor and stator occurs in space (moving along a physically continuous contact path over time) rather than in time (with intermittent contact between surfaces). Thus, in the present rotary machines, rather than periodically engaging and disengaging (or touching and separating), the contact surfaces and any associated seals slide across one another, or in close proximity to one another, continuously, with a kind of "scissoring" action relative to one another. In embodiments with an elliptical helical rotor, at least some portion of each of the two outwardly protruding crests (or threads) of the helical rotor continuously contact the stator, and at least some portion of the helical inverse apex region (or crests) of the stator continuously contacts the rotor. These contacting regions move along the crests of the rotor helical threads and helical inverse apex region of the stator, during rotation of the rotor in the stator. The entire inner surface area of the stator and the entire outer surface area of the rotor are swept at some point time during rotation of the rotor within the stator. Thus, there is a quasi-helical contact path between the rotor and stator at all times during rotation of the rotor (just as there is contact between the rotor tips and the stator, and between the inverse apex of the stator and the rotor, in the machine of FIGS. 1A-1G). The rotor-stator contact paths revolve around the machine as pumping action proceeds, "threading" the fluid (or material to be pumped) in a spiral path along the helix, so that it is moved axially from one end of the stator cavity to the other.

In the type of rotary machines described herein, rotor and stator seals (if both present) do not strike each other intermittently—they slide across one another. This, and having one or more continuous contact paths between rotor and stator, can facilitate the provision of sealing in embodiments of the present machines. In some embodiments it can be desirable to dispose one or more seals between the rotor and the stator components to reduce leakage of fluid between stages. Such seals can be mounted on the rotor or the stator, or both. They can be designed to be coextensive with the regions (lines or bands) on the rotor and/or stator that have continuous contact with the other component. For example, in embodiments of the present rotary machine with an offset geometry, the seals can span the arc lengths on the rotor and stator, as described in reference to FIGS. 17-19.

In some embodiments, for example, a helical seal may be provided in the stator, positioned along the locus of the trochoid generating point as the envelope is swept to produce the stator cavity, and/or seals may be provided along the crests of the two threads of the corresponding helical rotor that is elliptical in transverse cross-section. In both cases, the seals replace a defined portion of the rotor or stator cross-section. While the contact path is not necessarily precisely helical, the seal may be helical with the contact path sweeping across a seal surface of some finite width. In some embodiments, depending on the manufacturing tolerances of the components, the seal may protrude slightly from the surface of the rotor or stator. This can be done deliberately to energize the seal.

Figure 20:
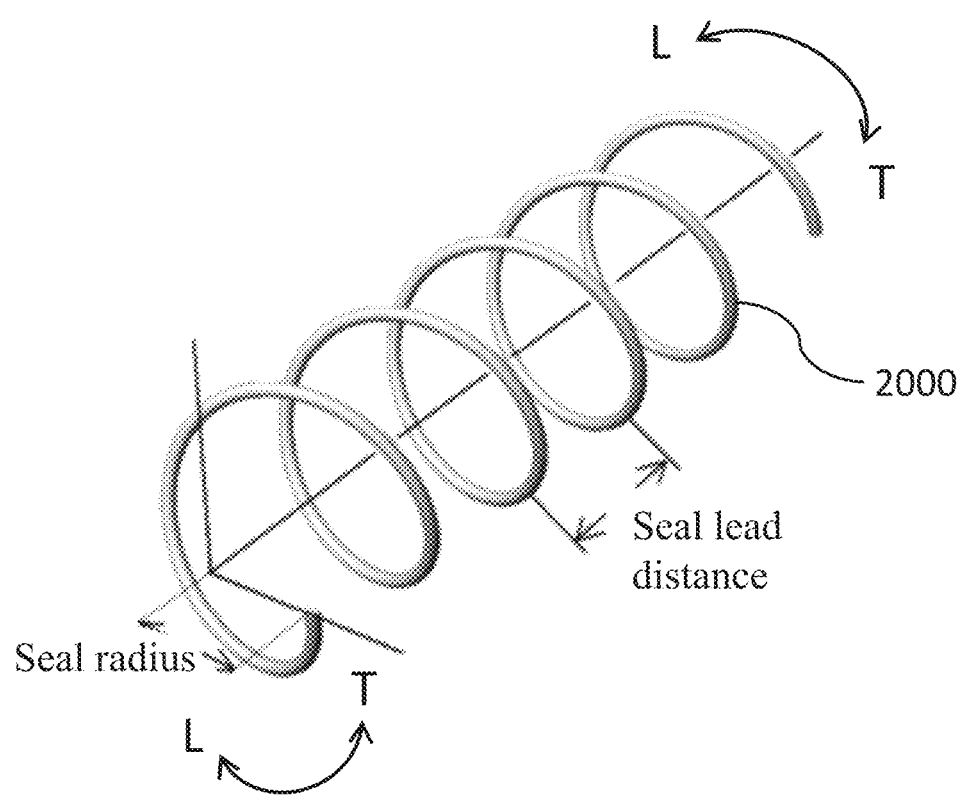
FIG. 20 illustrates an embodiment of a helical seal 2000 that can be accommodated in a corresponding groove formed in a helical stator or rotor.

FIG. 20 shows an example of a helical seal 2000 that can be accommodated, for example, in a corresponding groove formed in a helical stator or rotor, with the seal lead distance matching the lead of the corresponding stator or rotor.

Figure 21A:
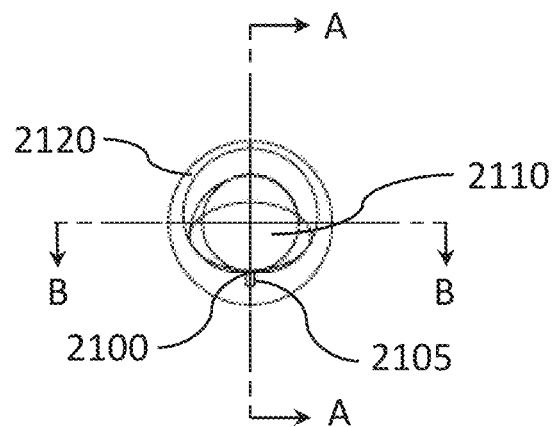
FIG. 21A is a cross-sectional view showing a helical seal installed in a groove in the interior surface of a stator.
Figure 21B:
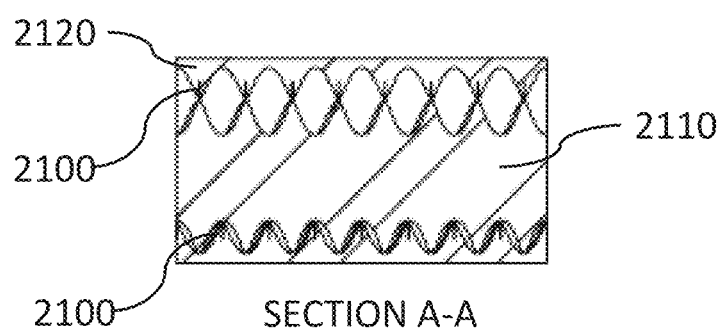
FIG. 21B is a cross-sectional view of the assembly of FIG. 21A taken in the direction of arrows A-A in FIG. 21A.
Figure 21C:
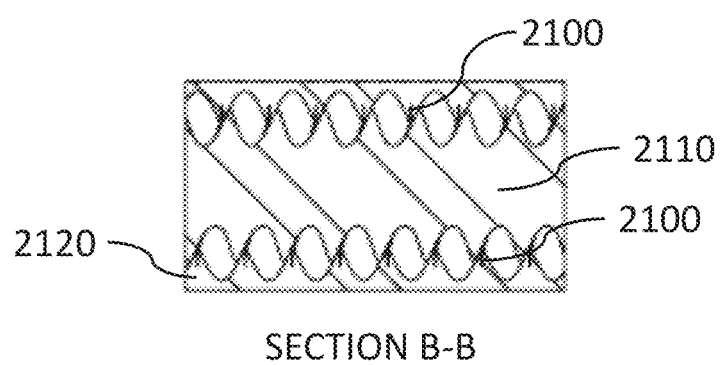
FIG. 21C is a cross-sectional view of the assembly of FIG. 21A taken in the direction of arrows B-B in FIG. 21A.

FIGS. 21A-21C show a helical seal 2100 installed in a groove 2105 in the interior surface of stator 2120 along the locus of the inverse apex region (i.e. along the inwardly protruding crest). Stator seal 2100 touches rotor 2110 continuously, the contact path with the rotor moving continuously along stator seal 2100, as rotor 2110 undergoes planetary motion within stator 2120. FIG. 21A is a cross-sectional view (transverse to the axis of rotation of rotor 2110) and FIGS. 21B and 21C are cross-sectional views as indicated by A-A and B-B in FIG. 21A, respectively.

Figure 22A:
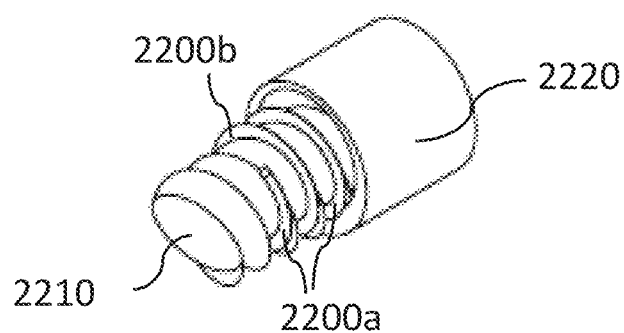
FIG. 22A is an isometric view of a portion of a rotor-stator assembly with a helical seal.
Figure 22B:
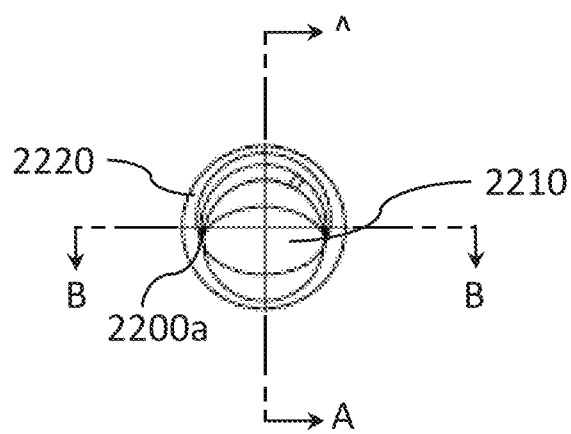
FIG. 22B is a cross-sectional view (transverse to the axis of rotation) of the assembly of FIG. 22A.
Figure 22C:
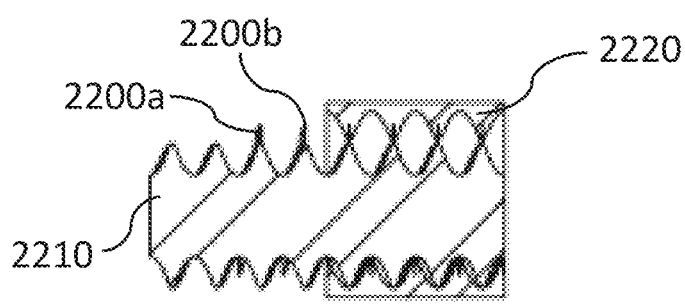
FIG. 22C is a cross-sectional view of the assembly of FIG. 22A taken in the direction of arrows A-A in FIG. 22B.
Figure 22D:
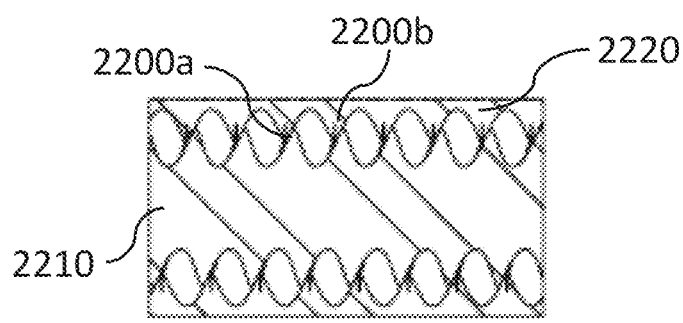
FIG. 22D is a cross-sectional view of the assembly of FIG. 22A taken in the direction of arrows B-B in FIG. 22B.

FIGS. 22A-22D show a pair of seals 2200a and 2200b installed in corresponding grooves in the exterior surface of helical rotor 2210, along the two outwardly protruding helical threads or crests. Seals 2200a and 2200b touch stator 2220 continuously, the contact path with the stator moving continuously along the rotor seals 2200a and 2200b over time, as rotor 2210 undergoes planetary motion within stator 2220. FIG. 22A is an isometric view of a portion of a rotor-stator assembly with a helical seal. FIG. 22B is a cross-sectional view (transverse to the axis of rotation) and FIGS. 22C and 22D are cross-sectional views as indicated by A-A and B-B in FIG. 22B, respectively. In FIGS. 22A and 22C stator 2220 is shown partially cut away to more clearly reveal 2210 rotor disposed therein, and seals 2200a and 2200b are partially cut away for clarity to show a portion of the rotor without the seals in place.

The stator and rotor seals can be made of any suitable material or combination of materials, subject to typical considerations for seal design and operation, and the nature of the working fluid. For example, softer materials can sometimes reduce the tendency for leakage, and hard materials can be more durable and less subject to wear.

Furthermore, the seal and corresponding mating features for the rotor and/or stator seals can be designed such that the seals are held securely in place during operation of the rotary machine. Some non-limiting examples of a stator seal profiles are illustrated in FIGS. 23A-D which show, in transverse cross-section (in a plane normal to the axis of the helical stator), partial views of stators (2310A to D) with various stator seals (2300A to D) mounted therein. Some non-limiting examples of rotor seal profiles are illustrated in FIGS. 24A-F which show, in transverse cross-section (in a plane normal to the axis of the helical rotor), partial views of rotors (2410A to F) with various rotor seals (2400 A to F) mounted therein.

Figure 23A:
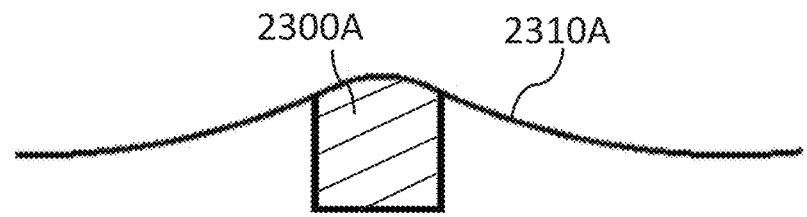
FIG. 23A illustrates an embodiment of a stator seal in transverse cross-section (in a plane normal to the axis of the helical stator).
Figure 23B:
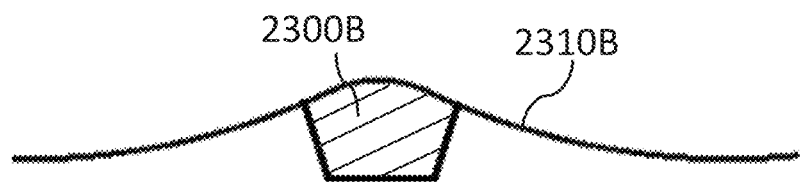
FIG. 23B illustrates another embodiment of a stator seal in transverse cross-section.
Figure 23C:
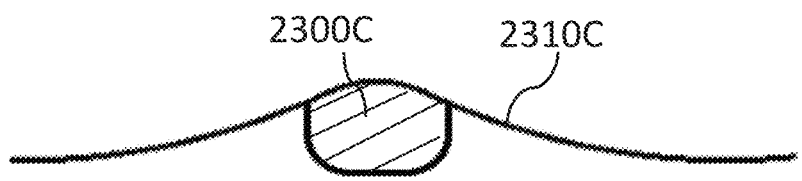
FIG. 23C illustrates another embodiment of a stator seal in transverse cross-section.
Figure 23D:
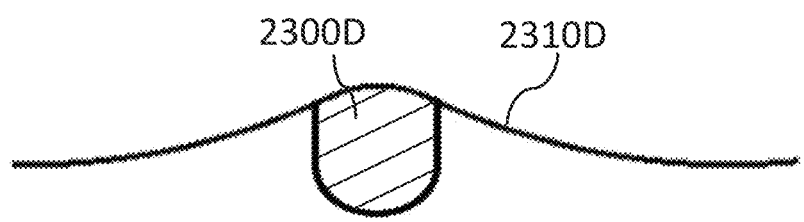
FIG. 23D illustrates another embodiment of a stator seal in transverse cross-section.
Figure 24A:
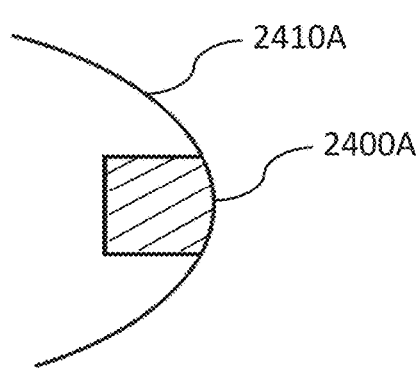
FIG. 24A illustrates an embodiment of a rotor seal in transverse cross-section (in a plane normal to the axis of the helical rotor).
Figure 24B:
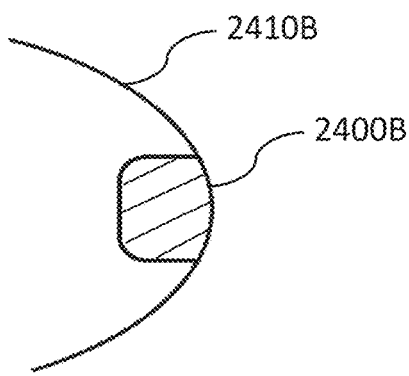
FIG. 24B illustrates another embodiment of a rotor seal in transverse cross-section.
Figure 24C:
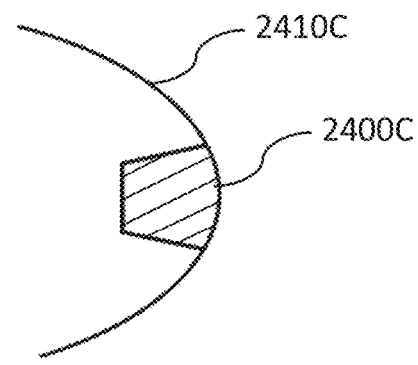
FIG. 24C illustrates another embodiment of a rotor seal in transverse cross-section.
Figure 24D:
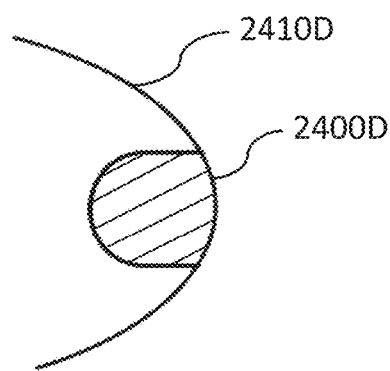
FIG. 24D illustrates another embodiment of a rotor seal in transverse cross-section.
Figure 24E:
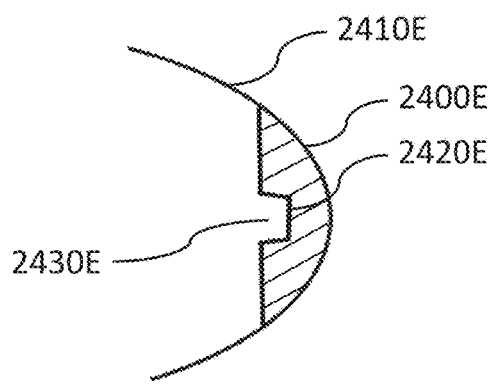
FIG. 24E illustrates another embodiment of a rotor seal in transverse cross-section.
Figure 24F:
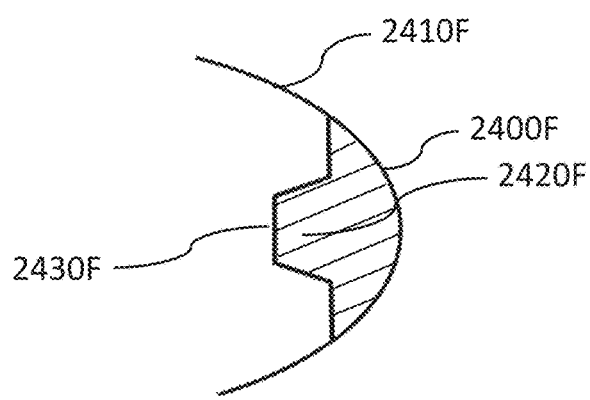
FIG. 24F illustrates another embodiment of a rotor seal in transverse cross-section.

Stator seal 2300A illustrated in FIG. 23A has parallel sides, whereas the stator seal 2300B illustrated in FIG. 23B has tapered sides. Seal 2300A may tend to maintain a better seal against corresponding stator 2310A. For example, as the seals wear, flex or move out of the corresponding grooves in stator (i.e. radially inwardly in a rotary-stator assembly), fluid is less likely to pass underneath seal 2300A than seal 2300B, where a gap under the seal may open up in this situation. However, this tendency for leakage around seal 2300B may be mitigated if there is a pressure differential across the seal, such that it is pushed against one side wall of the groove. In stator seals 2300C and 2300D illustrated in FIGS. 23C and 23D respectively, the corners of the seal are rounded rather than being sharp.

Similarly, rotor seals 2400A, 2400B and 2400D may tend to maintain a better seal against their corresponding grooved rotors, 2410A, 2410B and 2410D, respectively, than tapered rotor seal 2400C with rotor 2410C. Rotor seal 2400E has a parallel-sided groove 2420E in it, and there is a corresponding protruding ridge 2430E along the crest of rotor 2420E which fits into the seal groove 2420E. Seal groove 2420E tends to make the seal more flexible and springy, so that it accommodates radial in and out flexing, and/or wear of the rotor seal. Rotor seal 2400F has a protruding ridge 2420F that fits into corresponding tapered groove 2430F in rotor 2410F. Seal ridge 2420F tends to make the seal stiffer, which might be advantageous in some situations. Seals 2400E and 2400F are fatter (providing a wider resilient sweep width, relative to seals 2400A-D), and their stiffness can be controlled by the choice of material and their profile, as discussed above.

The seals on the rotor may be energized or pushed against the stator to provide a tighter seal, and to self-adjust or compensate for wear during operation of the rotary machine. Energization may be accomplished in a number of ways including, for example, using downstream high pressure fluid to exert a force on the underside of the seal, or using spring force as is done in conventional seal designs. For example, a rotor seal can be made with a seal radius (see FIG. 20) that is slightly too large, or oversized. The seal can be tightened (contracted radially) for installation on the rotor by rotating the ends of the seal in the direction indicated as T by the arrows shown in FIG. 20. The seal will then tend to press against the interior surface of the stator, and as the rotor seal wears it will tend to expand radially (outwardly) and continue to press against the interior surface of the stator. Similarly, the stator seal can be made with a seal radius (see FIG. 20) that is slightly too small, or undersized. The seal will then be pushed outwardly into the groove in the stator by the rotor, opening up the stator seal in the direction indicated as L by the arrows shown in FIG. 20. As the stator seal wears it will tend to contract radially (inwardly) and continue to press tightly against the rotor. In this way the spring-like properties of the spiral rotor and/or stator seals can be used to energize the seals, enhance the resiliency of the seals, and/or accommodate wear and thermal expansion/contraction.

As discussed above, in some embodiments of the rotary machines described herein, a seal that is used on the rotor or stator does not necessarily have to span the entire contact width or contact area between the rotor and stator. For example, the rotor or stator seal width can be less than the corresponding rotor or stator sweep width and/or the arc length of the rotor or stator seal can be less than the arc length of the corresponding rotor or stator.

Figure 25:
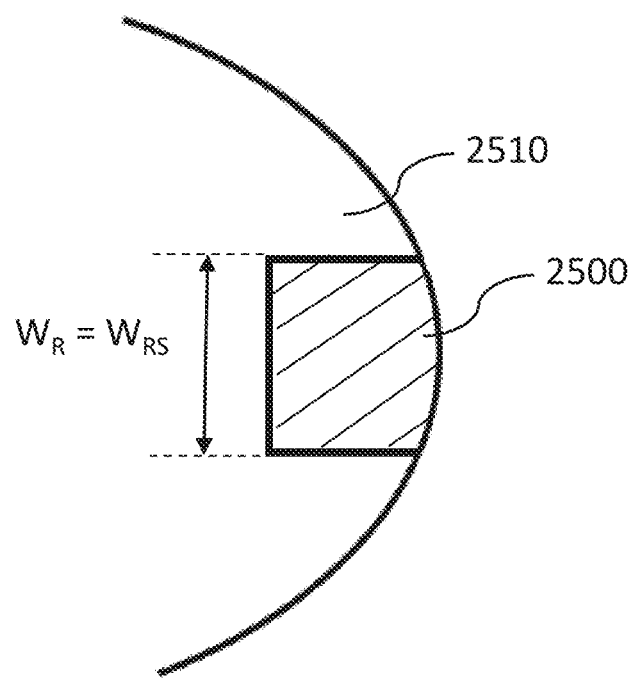
FIG. 25 is a cross-sectional view of a portion of a helical rotor with a rotor seal, where the seal width of the rotor seal is substantially the same as the sweep width of the rotor.

FIG. 25 is a cross-sectional view of a portion of a helical rotor with a rotor seal, and illustrates an example of a rotor seal 2500 where the seal width, $W_{RS}$, of the rotor seal (at the surface of the rotor) is substantially the same as the sweep width $W_R$ of the rotor 2510.

Figure 26:
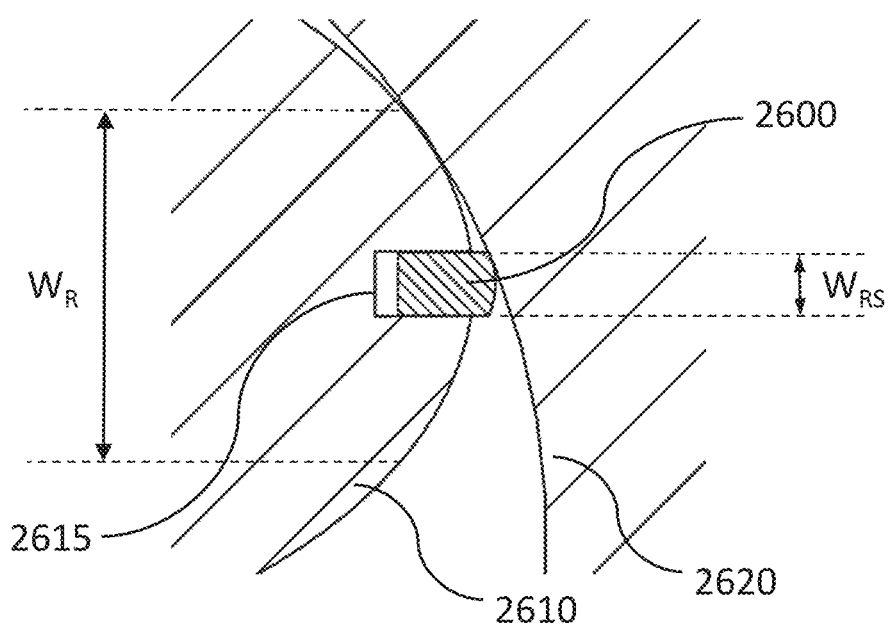
FIG. 26 is a cross-sectional view of a portion of a helical stator and rotor with a rotor seal, where the seal width of the rotor seal is substantially less than the sweep width of the rotor.

FIG. 26 is a cross-sectional view of a portion of a helical stator 2620 and rotor 2610, with a rotor seal 2600 mounted in a groove 2615 in rotor 2610. In this example, the seal width, $W_{RS}$, of rotor seal 2600 is substantially less than the sweep width $W_R$ of the rotor 2610. Seal 2600 can be sized so that as the rotor rotates relative to the stator, seal 2600 comes out of groove 2615 slightly and protrudes from the surface of rotor 2610 along at least a portion of its length, so that it may still contact the inner surface of stator 2620 and thereby maintain some sealing function between the stator and rotor. Such an arrangement can be beneficial. For example, narrower seals tend to be more flexible and resilient than fatter seals of the same material—this can enhance their dynamic sealing capabilities. Also, the rotor strength and durability may be less compromised by a narrower groove than a wider groove to accommodate the seal, and the rotor seal may be better supported by the thicker walls of the groove when the groove itself is narrower. A similar approach can be taken with a stator seal.

In operation of the rotary machine, frictional force will tend to move the rotor and/or stator seals helically, thus threading them out of the corresponding rotor or stator to which they are mounted. Various features can be used at one or both the ends of seals (and/or at one or more locations along the length of the seal) to limit or prevent seal travel. These include, for example, incorporating "dead ends" in the grooves, a feature at the end of the seal that is larger than the seal groove, and or a pin or fastener at one end of the seal.

In some embodiments each rotor seal is attached to the helical rotor at one end of rotor seal (the end from which the rotor seal tends to travel as the rotor revolves), and not at the other end, such that the action of rotor friction against the stator will hold the seal in tension, resulting in the seal tending to be drawn inwards into the rotor channel, and thereby reduce the tendency for wedging, camming or excessive friction against the stator. In some embodiments the stator seal is not attached to the stator, but the groove or channel which accommodates the seal can have a wall or dead-end (at least at the end toward which the stator seal tends to travel as the rotor revolves), which constrains or blocks the seal from moving along any further along the stator cavity. The stator seal will then abut or bottom out to the end of the groove in the stator. This will then tend to increase the radius of the stator seal, which in turn reduces the tendency for wedging, camming or excessive friction of the stator against the rotor.

The manner in which the rotor and stator seals are mounted and/or constrained may depend upon how the machine is to be driven. In some gearless embodiments the rotor is coupled to and driven by a motor (via a shaft) and the stator acts as a guide for the rotor to centralize and constrain motion of the rotor. In some such embodiments, it can be desirable that the stator seal has a channel depth equivalent to the seal depth such that the contact between the adjacent rotor and the stator seal consistently transfers guidance forces. Similarly it can be desirable that a rotor, with a stator guiding the rotor motion, also has rotor seals that bottom out in their respective channels allowing the rotor to maintain a controlled path. If the channels are deeper than the depth of the seals on the rotor and/or stator, the seals could retract into the channel and no longer provide stable rotor guidance from the interaction with the stator.

In some embodiments of the present rotary machines the rotor and/or stator seals are designed to be removable and easily replaceable. For example, in some rotary machines it may be relatively straightforward to remove the helical rotor from the stator and replace the rotor seals. In situations where it is easier to replace the rotor seal than the stator seal, it can be beneficial to design the stator seal to be more durable than the rotor seal.

In some of the embodiments of the rotary machines described herein, the various components (such as, for example, the rotor, stator cavity and rotor and stator seals) are truly helical or have a mathematically helical profile or shape. In other embodiments of the rotary machines described herein, it will be understood that the descriptive term "helical" is used more broadly to encompass components that have the general or approximate form of a helix or are "quasi-helical", and also to encompass variations on a helical form such as, for example, variable pitch helical or conical helical components.

As with other positive displacement machines, embodiments of the machines described herein can be used as hydraulic motors, pumps (including vacuum pumps), compressors, expanders, engines and the like. The helical rotary machines described herein can provide relatively high displacement/pump volume for their size, relative to PCPs for example.

In one application, embodiments of the machines described herein can be used in electric submersible pump (ESP) systems, for example, as downhole pumps in the oil and gas industry for pumping production fluids to the surface.

In the same application, embodiments of the machines described herein can be used for top driven submersible pumps driven by rotating shafts connecting a surface mounted drive system to the pump for example, as downhole pumps in the oil and gas industry for pumping production fluids to the surface.

Various different embodiments of the machines described herein can be particularly suitable for:

handling highly viscous fluids, as shear is low and the pump chambers have constant shape and volume (unless designed otherwise);

handling large pressure differentials with modest specific flow, as numerous stages can readily be provided;

use as vacuum pumps and compressors, because they are fully scavenging;

handling fluids with significant gas or solids content (because of their low shear operation, and particularly if additional features are used to enhance solids handling or tolerance);

pumping applications that require a long, narrow form (e.g. electrical submersible pump (ESP)).

applications where positive displacement pumping with steady flow is a high priority (e.g. very dense materials, such as concrete; flow metering or dosing, e.g. filling injection molds).

There are some important differences between conventional progressive cavity pumps (PCPs), and rotary machines having architectures as described herein. In rotary machines having architectures as described herein, there is a continuous line of contact between the rotor and stator. In some embodiments a metal spring seal (similar to a slinky toy or piston ring) can be used between the stator and rotor to provide a positive seal with no elastomer. In PCPs the stator is often made from or lined with an elastomer, to provide sealing. This material often degrades and needs to be replaced. In PCPs, the rotor interacts with a particular portion of the stator in at least two orientations. In rotary machines as described herein, the moving line of contact along the crest of the helical rotor only interacts with the stator in one orientation, which can provide operational advantages. A transverse cross-section of a typical PCP rotor-stator assembly shows a circular rotor positioned or contained between two parallel sides of the stator profile. This arrangement limits the ability of the rotor to move when a foreign particle such as sand or another hard substance becomes trapped in this contact region. The result is a potentially high abrasion condition. The rotor in rotary machines having architectures as described herein is not constrained in this manner. Furthermore, the rotary machines described herein have different flow characteristics than PCPs, which may be more favorable for certain applications.

All-metal PCPs typically have lower volumetric efficiencies and lower overall pump efficiencies than PCPs with an elastomer. The use of an elastomer in a PCP also typically enhances the solids handling capability of the pump versus an all-metal PCP, resulting in longer operational lifetimes in many applications. For example, in one study in a high temperature oil well application, the overall efficiency of an all-metal pump ranged from about 20-50% with a lifetime of less than 500 days, whereas a comparable elastomer PCP operated with efficiency in the range of 25-65% with about a 30 day longer lifetime. The efficiency of both types of PCP tends to decline quite rapidly during operation of the pump.

Embodiments of the helical trochoidal rotary machines described herein have been shown to provide high volumetric and overall efficiencies, and to operate with low degradation in efficiency over time.

EXAMPLE

Figure 27:
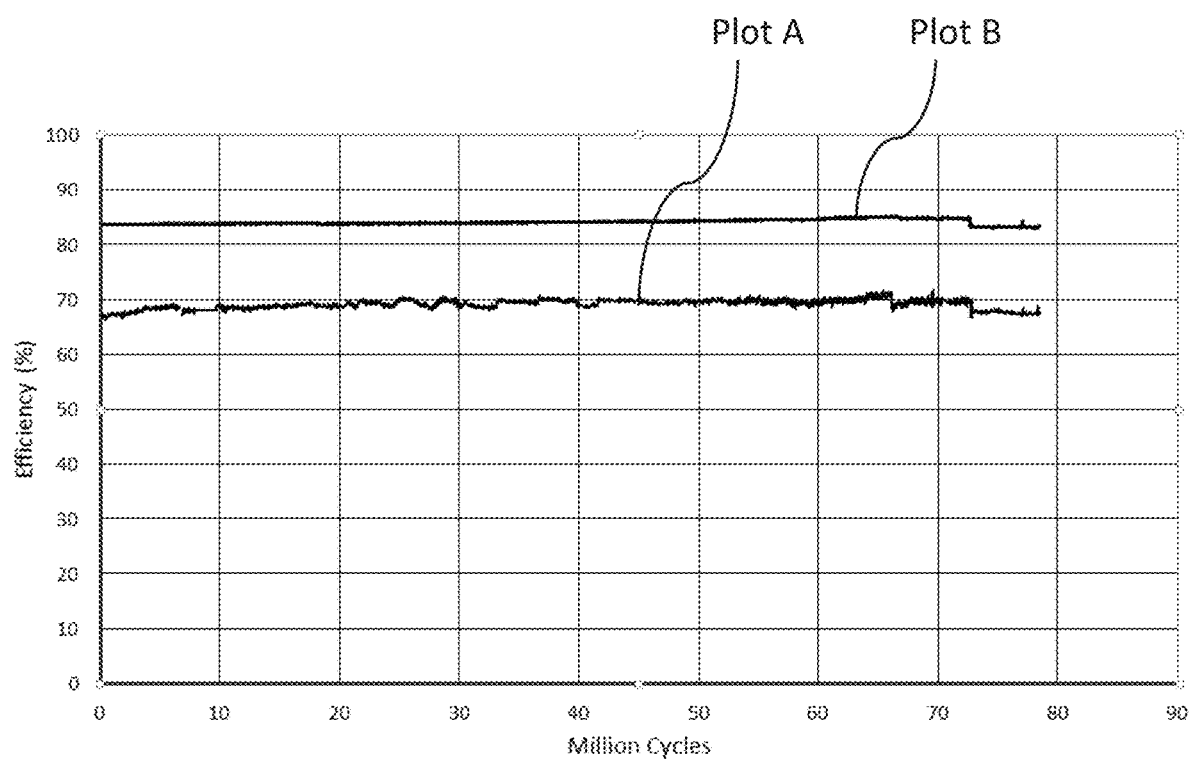
FIG. 27 is a graph showing results of testing of a 2-stage helical trochoidal rotary pump in which the overall efficiency and volumetric efficiency of the pump are plotted against the number of cycles.

Longevity testing was performed on a 2-stage helical trochoidal rotary pump (12 inches (30.48 cm) long, 2.8 inches (7.11 cm) diameter) having a rotor with an inward offset (relative to an elliptical transverse rotor cross-section) such that the rotor and stator peaks have a similar minimum radius. The rotor and stator were made of 4140 hardened steel. The operating fluid was mineral seal oil, a wellbore simulated fluid with a viscosity of 3 cP, intended to simulate a downhole lift application of oil with water cut. The pump was operated at 400 RPM with the pressure set at 25 psi per stage (50 psi total), and the flow rate was 25 GPM. The pump was operated and tested under these conditions over a period of 136 days, which at 400 RPM represents 78 million cycles. FIG. 27 is a graph showing the overall efficiency (plot A) and the volumetric efficiency (plot B) of the pump versus the number of cycles. Total efficiency is a measure of how much shaft power is converted into useful work. Volumetric efficiency is a measure of slip. Slip is the ratio of actual flow delivered by a pump at a given pressure to its theoretical flow, where the theoretical flow can be calculated by multiplying the pump's displacement per revolution by its driven speed. The observed volumetric and overall efficiency values are high, especially considering that both the rotor and stator are made of metal, and the pump did not have dynamic seals on the rotor or stator. As can be seen from FIG. 27, the pump demonstrated very little loss in overall and volumetric efficiency over the test period, and almost no loss over the first 70 million cycles.

While particular elements, embodiments and applications of the present invention have been shown and described, it will be understood that the invention is not limited thereto since modifications can be made by those skilled in the art without departing from the scope of the present disclosure, particularly in light of the foregoing teachings.

What is claimed is:

1. A rotary machine comprising a stator having a stator length and a stator axis, and a rotor having a rotor length and a rotor axis, said rotor disposed within said stator,
    said stator, along at least a portion of said stator length, having a stator helical profile and an epitrochoidal shape at any cross-section transverse to said stator axis,
    said rotor, along at least a portion of said rotor length, having a rotor helical profile and a rotor shape at any cross-section transverse to said rotor axis that is an inner envelope formed when said epitrochoidal shape of said stator undergoes planetary motion, said rotor configured to undergo planetary motion within said stator,
    wherein said rotary machine further comprises at least one helical rotor seal mounted on said rotor and/or at least one helical stator seal mounted on said stator.

2. The rotary machine of claim 1 wherein:
    said epitrochoidal shape of said stator has n−1 lobes, where n is an integer; said rotor shape has n lobes;
    said rotor has a rotor pitch and a rotor lead, and said stator has a stator pitch and a stator lead;
    said rotor pitch is the same as said stator pitch; and
    a ratio of said rotor lead to said stator lead is n:(n−1).

3. The rotary machine of claim 2 wherein n=2, said rotor pitch is the same as said stator pitch, and said ratio of rotor lead to stator lead is 2:1.

4. The rotary machine of claim 3 wherein said rotary machine is a multi-stage machine having a plurality of chambers between cooperating surfaces of said rotor and said stator.

5. The rotary machine of claim 4 wherein each of said plurality of chambers has approximately the same volume.

6. The rotary machine of claim 4 wherein at least one of said plurality of chambers has a volume that is different from another of said plurality of chambers.

7. The rotary machine of claim 1 wherein said at least one helical seal comprises at least one rotor seal mounted on said rotor.

8. The rotary machine of claim 1 wherein said at least one helical seal comprises at least one stator seal mounted on said stator.

9. The rotary machine of claim 1 wherein said at least one helical seal comprises at least one rotor seal mounted on said rotor and at least one stator seal mounted on said stator.

10. The rotary machine of claim 1 wherein said at least one helical seal comprises a rotor seal mounted on said rotor by cooperating mating features on said rotor and said rotor seal, and/or a stator seal mounted on said stator by cooperating mating features on said stator and said stator seal.

11. A rotary machine comprising a stator having a stator length and a stator axis, and a rotor having a rotor length and a rotor axis, said rotor disposed within said stator,
    said stator, along at least a portion of said stator length, having a stator helical profile and a stator shape that is outwardly offset from an epitrochoidal shape at any cross-section transverse to said stator axis,
    said rotor, along at least a portion of said rotor length, having a rotor helical profile and a rotor shape at any cross-section transverse to said rotor axis that is an inner envelope formed when said stator shape undergoes planetary motion, said rotor configured to undergo planetary motion within said stator,
    wherein said rotary machine further comprises at least one helical rotor seal mounted on said rotor and/or at least one helical stator seal mounted on said stator.

12. The rotary machine of claim 11 wherein:
said stator shape has n−1 lobes, where n is an integer;
said rotor shape has n lobes;
said rotor has a rotor pitch and a rotor lead, and said stator has a stator pitch and a stator lead;
said rotor pitch is the same as said stator pitch; and
a ratio of said rotor lead to said stator lead is n:(n−1).

13. The rotary machine of claim 12 wherein n=2, said rotor pitch is the same as said stator pitch, and said ratio of said rotor lead to said stator lead is 2:1.

14. The rotary machine of claim 13 wherein said rotary machine is a multi-stage machine having a plurality of chambers between cooperating surfaces of said rotor and said stator.

15. The rotary machine of claim 14 wherein at least one of said plurality of chambers has a volume that is different from another of said plurality of chambers.

16. The rotary machine of claim 14 wherein each of said plurality of chambers has approximately the same volume.

17. The rotary machine of claim 11 wherein said at least one helical seal comprises at least one rotor seal mounted on said rotor.

18. The rotary machine of claim 11 wherein said at least one helical seal comprises at least one stator seal mounted on said stator.

19. The rotary machine of claim 11 wherein said at least one helical seal comprises at least one rotor seal mounted on said rotor and at least one stator seal mounted on said stator.

20. The rotary machine of claim 11 wherein said at least one helical seal comprises a rotor seal mounted on said rotor thread by cooperating mating features on said rotor and said rotor seal, and/or a stator seal mounted on said stator by cooperating mating features on said stator and said stator seal.

* * * * *